(12) United States Patent
Handa

(10) Patent No.: US 9,575,574 B2
(45) Date of Patent: Feb. 21, 2017

(54) COORDINATE DETECTION SYSTEM, COORDINATE DETECTION METHOD, AND INFORMATION PROCESSING DEVICE

(71) Applicant: Masato Handa, Kanagawa (JP)

(72) Inventor: Masato Handa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 87 days.

(21) Appl. No.: 14/589,026

(22) Filed: Jan. 5, 2015

(65) Prior Publication Data
US 2015/0193026 A1     Jul. 9, 2015

(30) Foreign Application Priority Data

Jan. 7, 2014 (JP) .................................. 2014-001019
Dec. 3, 2014 (JP) .................................. 2014-244651

(51) Int. Cl.
G06F 3/033   (2013.01)
G06F 3/0354  (2013.01)
G06F 3/042   (2006.01)

(52) U.S. Cl.
CPC ......... *G06F 3/03545* (2013.01); *G06F 3/0421* (2013.01)

(58) Field of Classification Search
CPC .. G06F 3/0421; G06F 3/0428; G06F 3/03545; G06F 2203/04101; G06F 3/042; G01B 11/03; G01B 11/24; H04N 2201/0438
See application file for complete search history.

(56) References Cited

U.S. PATENT DOCUMENTS

| 6,437,314 B1* | 8/2002 | Usuda | G06F 3/03545 |
| | | | 178/19.05 |
| 6,654,007 B2* | 11/2003 | Ito | G06F 3/0421 |
| | | | 178/18.01 |
| 8,629,989 B2* | 1/2014 | Kobayashi | G06F 3/0428 |
| | | | 29/428 |
| 2012/0007815 A1* | 1/2012 | Kim | G06F 3/017 |
| | | | 345/173 |

FOREIGN PATENT DOCUMENTS

| JP | 2004-038528 | 2/2004 | |
| JP | 2005-078433 | 3/2005 | |
| JP | 2005-173684 | 6/2005 | |
| TW | 200516474 A * | 5/2005 | G06F 3/0421 |

* cited by examiner

*Primary Examiner* — Andrew Sasinowski
*Assistant Examiner* — Gerald Oliver
(74) *Attorney, Agent, or Firm* — IPUSA, PLLC

(57) ABSTRACT

A coordinate detection system includes a coordinate input device including a panel surface, an indication tool including a tip part with a conical shape or truncated-conical shape, a first image taking device to take a first image of the indication tool, a second image taking device to take a second image of the indication tool, and an information processing device to detect a first set of two oblique lines of the conical shape or truncated-conical shape based on the first image, detect a second set of two oblique lines of the conical shape or truncated-conical shape based on the second image, and calculate coordinates of a vertex of the tip part on the panel surface based on a first point of intersection between two oblique lines included in the first set and a second point of intersection between two oblique lines included in the second set.

9 Claims, 21 Drawing Sheets

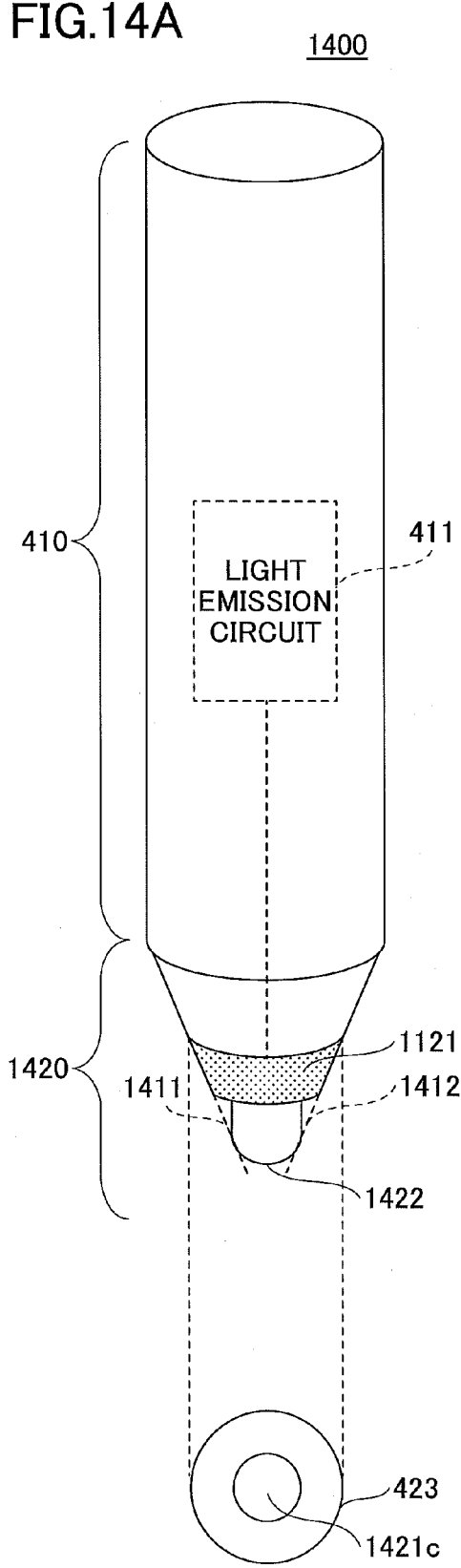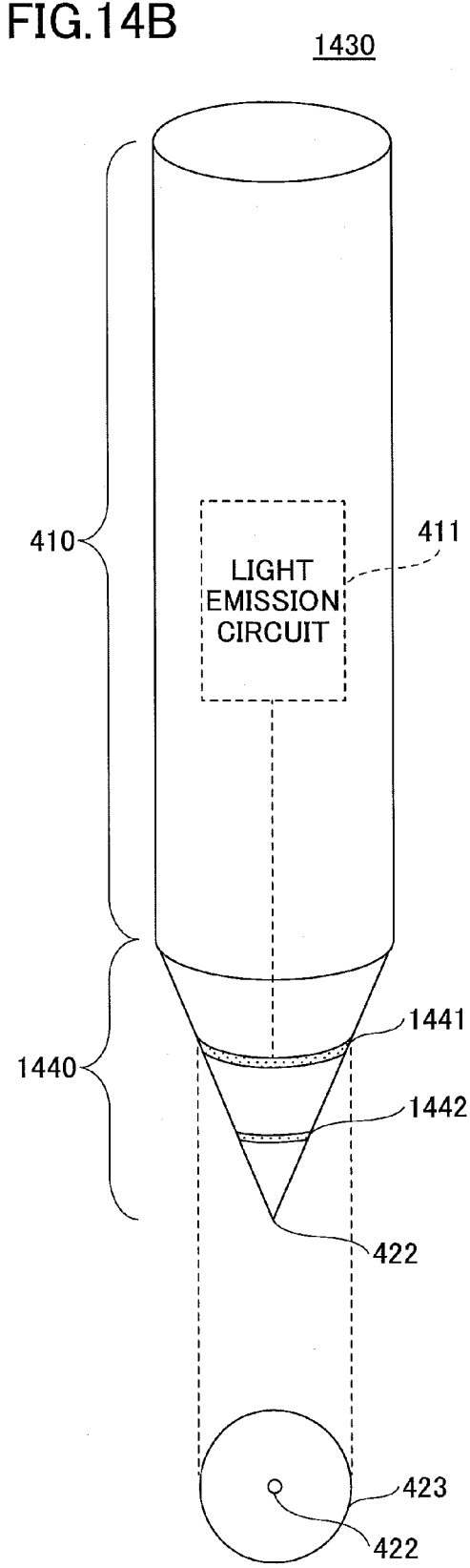

COORDINATE DETECTION SYSTEM, COORDINATE DETECTION METHOD, AND INFORMATION PROCESSING DEVICE

BACKGROUND OF THE INVENTION

1. Field of the Invention

An aspect of the present invention relates to at least one of a coordinate detection system, a coordinate detection method, and an information processing device.

2. Description of the Related Art

Conventionally, a coordinate detection system has been known that detects coordinates indicated by an indication tool such as an electronic pen on a coordinate input device and executes display of a handwritten character or the like. In such a coordinate detection system, a variety of coordinate detection methods have been proposed that detect a position where a tip part of an indication tool contacts an input surface a coordinate input device. For example, Japanese Patent Application Publication No. 2004-038528 discloses an optical coordinate detection method wherein coordinates of a contact position of a tip part of an indication tool are detected in accordance with a process as described below.

Specifically, one-dimensional image sensors are placed at both edges of coordinate input device and detect revolution angles of two light emission points disposed on an indication tool with respect to a reference direction. Then, coordinates of such two light emission points are calculated based on detected revolution angles in accordance with a principle of triangulation. Moreover, coordinates of a tip part (that is, a contact position) are detected based on calculated coordinates of such two light emission points and known data of an indication tool (a distance between two light emission points or a distance from a light emission point to a tip part).

However, there is a problem as described below in a case of an optical coordinate detection method disclosed in Japanese Patent Application Publication No. 2004-038528.

For example, in a case where a light emission point is covered by a hand when the user holds an indication tool, it is not possible for one-dimensional image sensor part to detect the light emission point so that it is not possible to detect coordinates of a tip part. For this reason, it is necessary for a user to be careful in such a manner that, when an indication tool is held, a holding hand does not cover a light emission point in an image-taking direction of a one-dimensional image sensor part.

Furthermore, it is also considered that defocusing may be caused near a one-dimensional image sensor part or one light emission point may be out of an angle of field. For this reason, it is necessary for a user to be careful in such a manner that input of a handwritten character or the like is executed in an area that is appropriately away from a one-dimensional image sensor part.

Thus, it has not necessarily been considered that operability is good for a user in a case of a conventional optical coordinate detection system.

SUMMARY OF THE INVENTION

According to one aspect of the present invention, there is provided a coordinate detection system, including a coordinate input device configured to include a panel surface, an indication tool configured to execute an indication operation on the panel surface, the indication tool including a tip part with one of a conical shape and a truncated-conical shape, a first image taking device configured to take a first image of the indication tool, the first image taking device being disposed on the panel surface, a second image taking device configured to take a second image of the indication tool, the second image taking device being disposed on the panel surface, and an information processing device configured to detect a first set of two oblique lines of the one of a conical shape and a truncated-conical shape based on the first image, detect a second set of two oblique lines of the one of a conical shape and a truncated-conical shape based on the second image, and calculate coordinates of a vertex of the tip part on the panel surface based on a first point of intersection between two oblique lines included in the first set and a second point of intersection between two oblique lines included in the second set.

According to another aspect of the present invention, there is provided a coordinate detection method, including executing an indication operation on a panel surface included in a coordinate input device by an indication tool including a tip part with one of a conical shape and a truncated-conical shape, taking a first image of the indication tool by a first image taking device disposed on the panel surface, taking a second image of the indication tool by a second image taking device disposed on the panel surface, detecting a first set of two oblique lines of the one of a conical shape and a truncated-conical shape based on the first image, detecting a second set of two oblique lines of the one of a conical shape and a truncated-conical shape based on the second image, and calculating coordinates of a vertex of the tip part on the panel surface based on a first point of intersection between two oblique lines included in the first set and a second point of intersection between two oblique lines included in the second set.

According to another aspect of the present invention, there is provided an information processing device, including a computer, the computer being configured to execute a process including taking a first image of an indication tool including a tip part with one of a conical shape and a truncated-conical shape by a first image taking device disposed on a panel surface included in a coordinate input device, taking a second image of the indication tool by a second image taking device disposed on the panel surface, detecting a first set of two oblique lines of the one of a conical shape and a truncated-conical shape based on the first image, detecting a second set of two oblique lines of the one of a conical shape and a truncated-conical shape based on the second image, and calculating coordinates of a vertex of the tip part on the panel surface based on a first point of intersection between two oblique lines included in the first set and a second point of intersection between two oblique lines included in the second set.

BRIEF DESCRIPTION OF THE DRAWINGS

FIG. 14A and FIG. 14B are diagrams that illustrate other configurations of an indication tool.

DETAILED DESCRIPTION OF THE PREFERRED EMBODIMENTS

Figure 1:
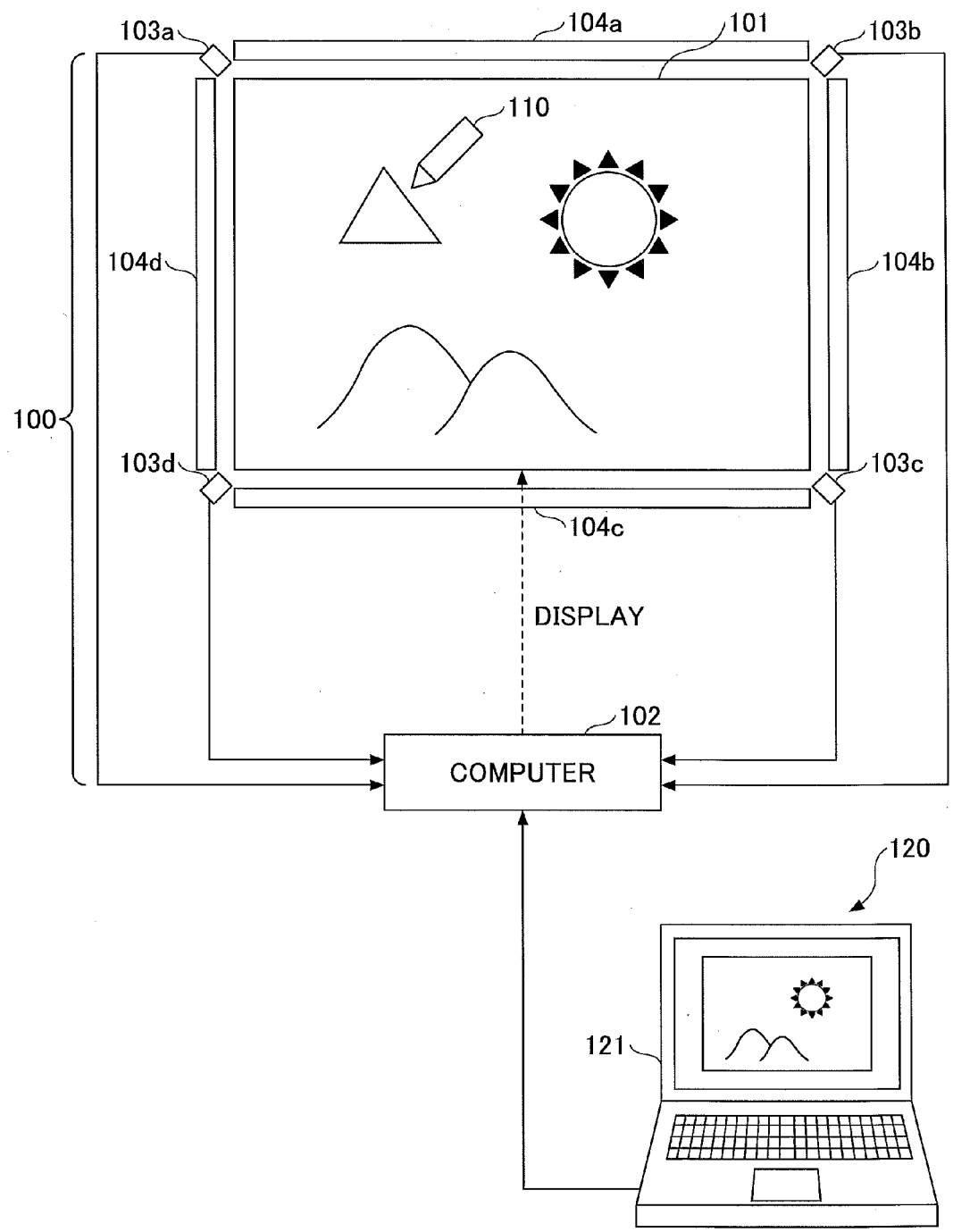
FIG. 1 is a diagram that illustrates one example of a system configuration of a coordinate detection system according to an embodiment.

An embodiment of the present invention will be described below, with reference to the accompanying drawings. Here, in the present specification and the drawings, an identical reference numeral or character will be provided to a component that has a substantially identical functional configuration, and thereby, a redundant description will be omitted.

A First Embodiment

A System Configuration of a Coordinate Detection System

First, a system configuration of a coordinate detection system according to the present embodiment will be described. FIG. 1 is a diagram that illustrates one example of a system configuration of a coordinate detection system 100 according to the present embodiment.

As illustrated in FIG. 1, the coordinate detection system 100 has a coordinate input device 101, a computer (information processing device) 102, two-dimensional image sensor parts 103a-103d, peripheral light emission parts 104a-104d, and an indication tool 110. Furthermore, a terminal device 120 is connected to the computer (information processing device) 102 in the coordinate detection system 100.

The coordinate input device 101 displays an image produced in the terminal device 120 and displays a content that is handwritten and inputted such that a user executes an indication operation by the indication tool 110 on an input surface that is a panel surface of the coordinate input device 101.

The computer (information processing device) 102 executes a control in such a manner that an image transmitted from the terminal device 120 is displayed on the coordinate input device 101. An example in FIG. 1 illustrates a case where an image displayed on a display device 121 of the terminal device 120 is displayed.

Furthermore, the computer 102 analyzes an indication on an input surface of the coordinate input device 101 (a position of contact between an input surface and a tip part of the indication tool 110) in a real time based on a taken image that is taken by the two-dimensional image sensor parts 103a-103d so that time-series coordinates are produced. Then, a control is executed in such a manner that a line is produced by connecting produced time-series coordinates and displayed on the coordinate input device 101 as a handwritten and inputted content.

An example in FIG. 1 illustrates a situation such that a user moves the indication tool 110 along a triangular shape and thereby the computer 102 superimposes a set of coordinates as one stroke (triangle) on an image during display.

Thus, it is possible for a user to implement various instructions by only using the indication tool 110 to touch the coordinate input device 101 in the coordinate detection system 100 according to the present embodiment even though the coordinate input device 101 does not have a touch panel function.

The two-dimensional image sensor parts 103a-103d are image sensor parts for taking an image of an entire input surface of the coordinate input device 101 and are arranged at predetermined positions of an input surface of the coordinate input device 101 (in the present embodiment, positions of both edges). Here, in the present embodiment, the two-dimensional image sensor parts 103a and 103b take images of an upper half of an input surface of the coordinate input device 101 and the two-dimensional image sensor parts 103c and 103d take images of a lower half of the input surface of the coordinate input device 101. Coordinates of a contact position of a tip part of the indication tool 110 are calculated based on a taken image obtained in such a manner that such image sensor parts take images of the indication tool 110.

The peripheral light emission parts 104a-104d are arranged around the coordinate input device 101 and irradiate an input surface of the coordinate input device 101. Here, the peripheral light emission parts 104a-104d may be configured to be detachably installed on the coordinate input device 101.

<A Hardware Configuration of a Coordinate Detection System>

Figure 2:
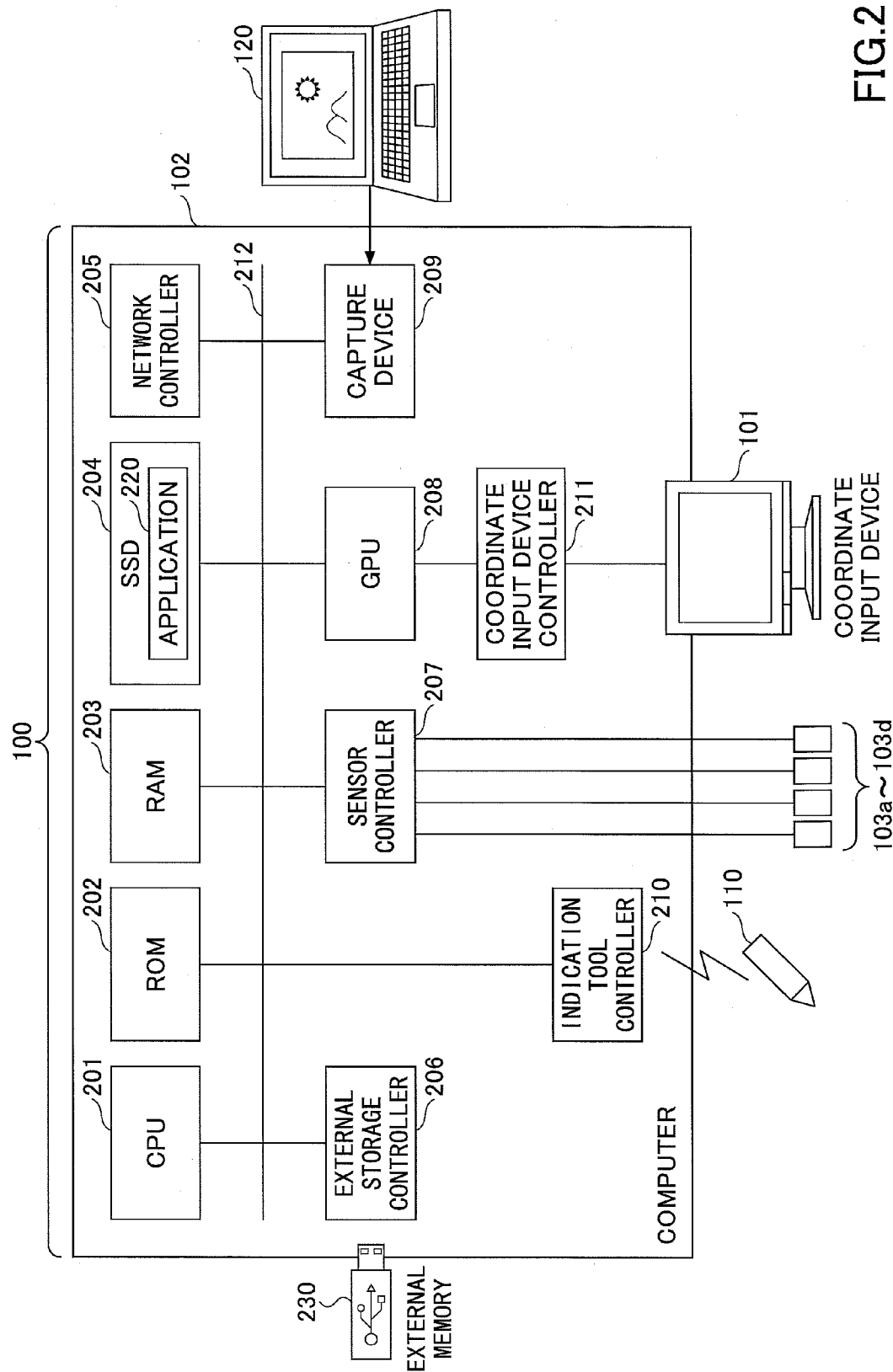
FIG. 2 is a diagram that illustrates a hardware configuration of a coordinate detection system.

Next, a hardware configuration of the coordinate detection system 100 will be described. FIG. 2 is a diagram that illustrates a hardware configuration of the coordinate detection system 100.

In FIG. 2, the computer 102 is an information processing device developed for a commercially available information processing device or coordinate detection system. The computer 102 has a CPU 201, a ROM 202, a RAM 203, a Solid State Drive (SSD) 204, and a network controller 205 that are electrically connected via a bus line 212 such as an address bus or a data bus. Moreover, it has an external storage controller 206, a sensor controller 207, a Graphic Processing Unit (GPU) 208, and a capture device 209.

The CPU 201 executes an application 220 to control an entire operation of the coordinate detection system 100. The ROM 202 stores an Initial Program Loader (IPL) or the like, or mainly stores a program that is executed by the CPU 201 at a time of boot. The Ram 203 functions as a work area in a case where the CPU 201 executed the application 220.

The SSD 204 is a non-volatile memory that stores the application 220 and a variety of data for a coordinate detection system. The network controller 205 executes a process based on a communication protocol for communicating with a server or the like via a network. Herein, a network as referred to herein includes Local Area Network (LAN), a Wide Area Network (WAN, for example, the Internet) wherein a plurality of LANs are connected, or the like.

The external storage controller 206 executes reading out from a detachable external memory 230. The external memory 230 is, for example, a Universal Serial Bus (USB) memory, an SD card, or the like.

The sensor controller 207 is connected to the four two-dimensional image sensor parts 103a-103d and controls image taking on these four two-dimensional image sensor parts 103a-103d.

The GPU 208 is a rendering-dedicated processor for operating or calculating a pixel value of each pixel of an image that is displayed on the coordinate input device 101. A coordinate input device controller 211 outputs an image produced by the GPU 208 to the coordinate input device 101.

The capture device 209 incorporates (captures) an image displayed by the terminal device 120 and on the display device 121.

Here, it is not necessary to execute communication with the indication tool 110 in a case of the coordinate detection system 100 according to the present embodiment, and the computer 102 may have a communication function for executing communication with the indication tool 110. In this case, as illustrated in the figure, the computer 102 has an indication tool controller 210 to execute communication with the indication tool 110. Thereby, it is possible for the computer 102 to receive a control signal from the indication tool 110.

Here, the application 220 may be stored in the external memory 230 and distributed in such a state or may be downloaded from an external server via a network controller 205. Here, in such a case, an application may be in a compressed state or may be in an executable format or state.

<A Functional Configuration of an Information Processing Device>

Figure 3:
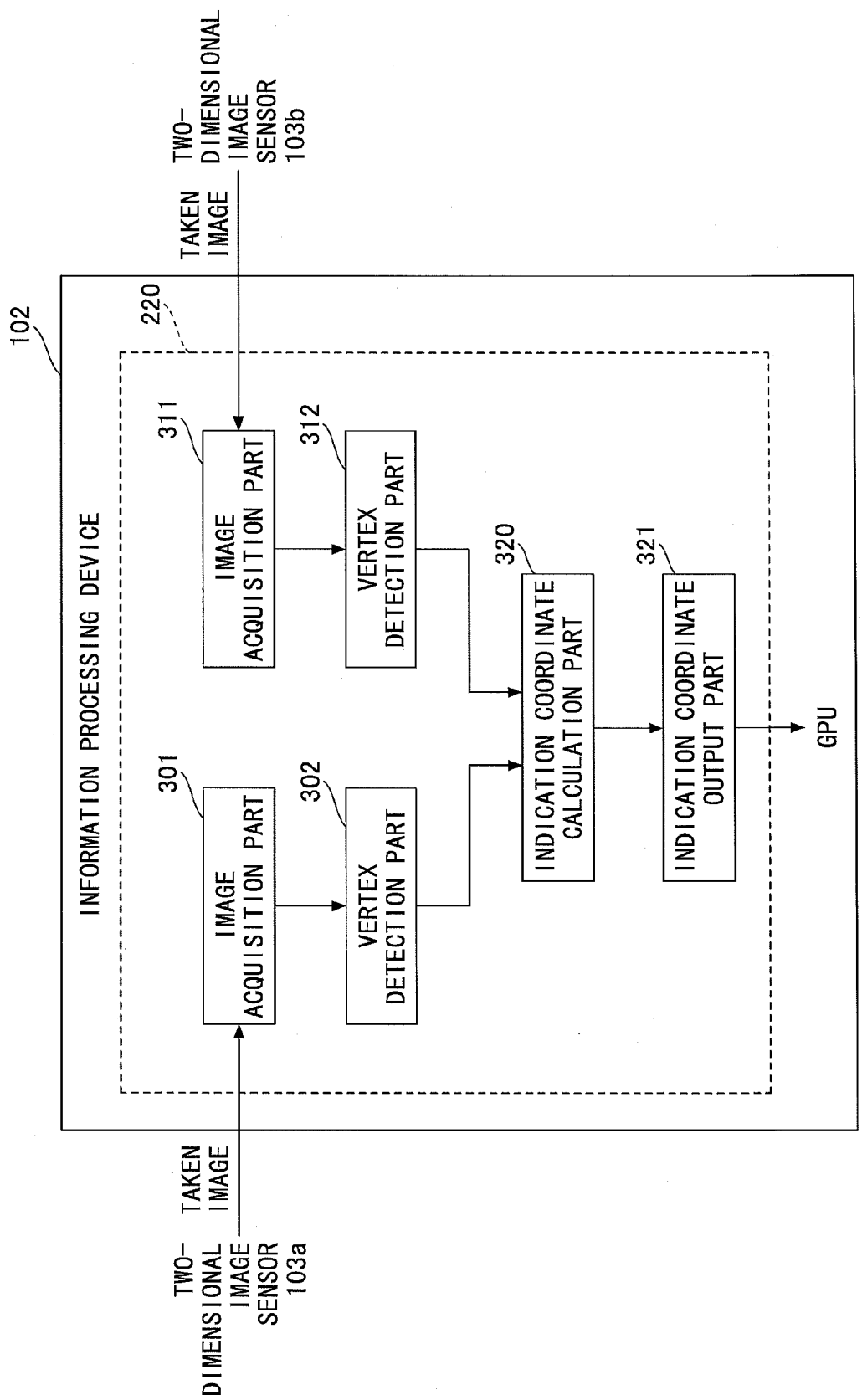
FIG. 3 is a functional configuration diagram that illustrates a function that is realized in an information processing device.

Next, a function will be described that is realized by executing the application 220 in the computer (information processing device) 102. FIG. 3 is a functional configuration diagram that illustrates a function to be realized in the information processing device 102.

As illustrated in FIG. 3, a function to be realized in the information processing device 102 includes that of image acquisition parts 301 and 311, vertex detection parts 302 and 312, or an indication coordinate output part 321.

The image acquisition parts 301 and 311 acquire taken images that are taken by the two-dimensional image sensor parts 103a and 103b, respectively.

The vertex detection parts 302 and 312 detect a vertex of a tip part of the indication tool 110 (a part that contacts an input surface of the coordinate input device 101 when a user executes an indication operation by using the indication tool 110) from taken images that are acquired by the image acquisition parts 301 and 311, respectively.

The indication coordinate calculation part 320 calculates coordinate indicated by the indication tool 110 on an input surface of the coordinate input device 101 based on a position of a tip part of the indication tool that is detected by a taken image.

The indication coordinate output part 321 outputs to the GPU 208 coordinates indicated by the indication tool 110 that are calculated by the indication coordinate calculation part 320.

<A Configuration of an Indication Tool>

Figure 4:
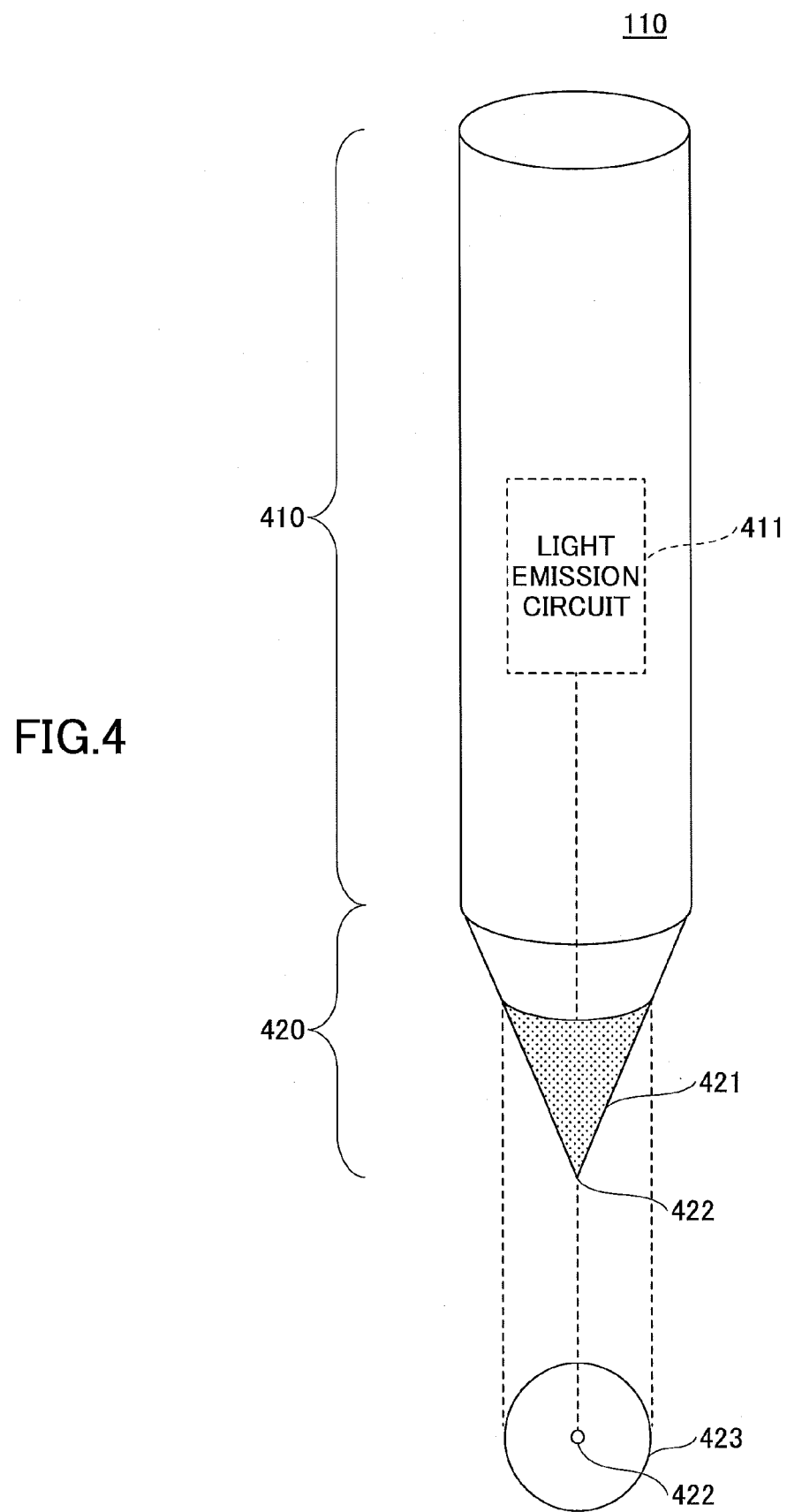
FIG. 4 is a diagram that illustrates a configuration of an indication tool.

Next, a configuration of the indication tool 110 will be described. FIG. 4 is a diagram that illustrates a configuration of the indication tool 110. As illustrated in FIG. 4, the indication tool 110 has a holding part 410 that is held by a user and a tip part 420 that contacts an input surface of the coordinate input device 101.

The holding part 410 has a circularly cylindrical shape that is readily held by a user and a light emission circuit 411 is disposed in an interior thereof. The tip part 420 has a conical shape and a tip side thereof is composed of a light emission part 421. ON/OFF of the light emission part 421 is controlled by the light emission circuit 411 wherein light emission is provided in an ON state.

A vertex 422 of the tip part 420 is a portion that directly contacts an input surface of the coordinate input device 101, and coordinates of the vertex 422 on an input surface of the coordinate input device 101 are coordinates indicated by the indication tool 110. As illustrated in FIG. 4, the vertex 422 of the tip part 420 in the present embodiment is disposed at a position of a center of a circle 423 that is a cross section of the light emission part 421.

<A Description of a Coordinate Detection Function of a Coordinate Detection System>

Next, a coordinate detection function of the coordinate detection system 100 will be described.

<A Description of a Principle of Coordinate Detection>

Figure 5:
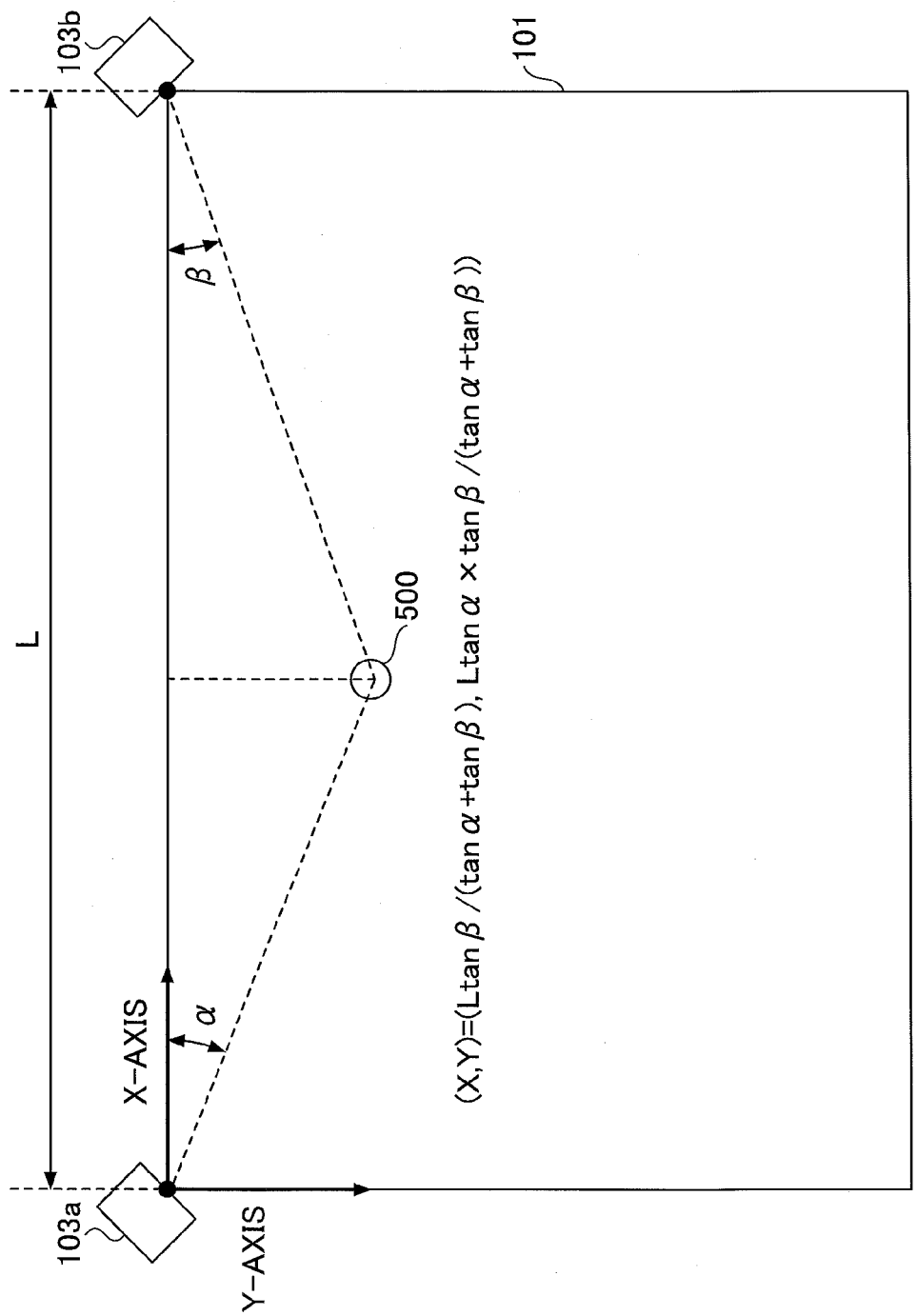
FIG. 5 is a diagram for illustrating a principle of coordinate detection.

First, a principle of coordinate detection will be described. FIG. 5 is a diagram for illustrating a principle of coordinate detection, and schematically illustrates a positional relationship between a predetermined point 500 on an input surface of the coordinate input device 101 that composes the coordinate detection system 100 and the two-dimensional image sensor parts 103a and 103b. Herein, a method for calculation of coordinates of the predetermined point 500 on an input surface will be described to describe a principle of coordinate detection (a method of triangulation).

As illustrated in FIG. 5, the two-dimensional image sensor parts 103a and 103b (a first image taking device and a second image taking device) that take taken images that are used for calculation of coordinates of the point 500 are arranged at an upper left corner part and an upper right corner part of the coordinate input device 101, respectively.

Herein, an upper left corner part of the coordinate input device 101 is provided with an origin and a transverse direction and a longitudinal direction of the coordinate input device 101 are provided with an X-axis and a Y-axis, respectively. Furthermore, a revolution angle of the point 500 with respect to an direction of X-axis (reference direction) when viewed from the two-dimensional image sensor part 103a is a and a revolution angle of the point 500 with respect to an direction of X-axis (reference direction) when viewed from the two-dimensional image sensor part 103b is β. Moreover, a width of the coordinate input device 101 in a direction of X-axis is L.

Under such a definition, a Y-coordinate of the predetermined point 500 is represented by using an X-coordinate as follows:

$$Y = X \tan \alpha \quad \text{(formula 1)}$$

$$Y = (L-X)\tan \beta \quad \text{(formula 2)}.$$

Herein, as Y is eliminated from formula 1 and formula 2 and simplification with respect to X provides:

$$X = L \tan \beta/(\tan \alpha + \tan \beta) \quad \text{(formula 3)}.$$

Moreover, formula 3 is substituted into formula 1 to provide:

$$Y = L \tan \alpha \times \tan \beta/(\tan \alpha + \tan \beta) \quad \text{(formula 4)}.$$

That is, it is possible to calculate an X-coordinate and a Y-coordinate of the point 500 by calculating, and substituting into formula 3 and formula 4, revolution angles α and β of the point 500 with respect to a direction of X-axis (reference direction) based on taken images that are taken by the two-dimensional image sensor parts 103a and 103b.

<A Description of a Taken Image>

Figure 6:
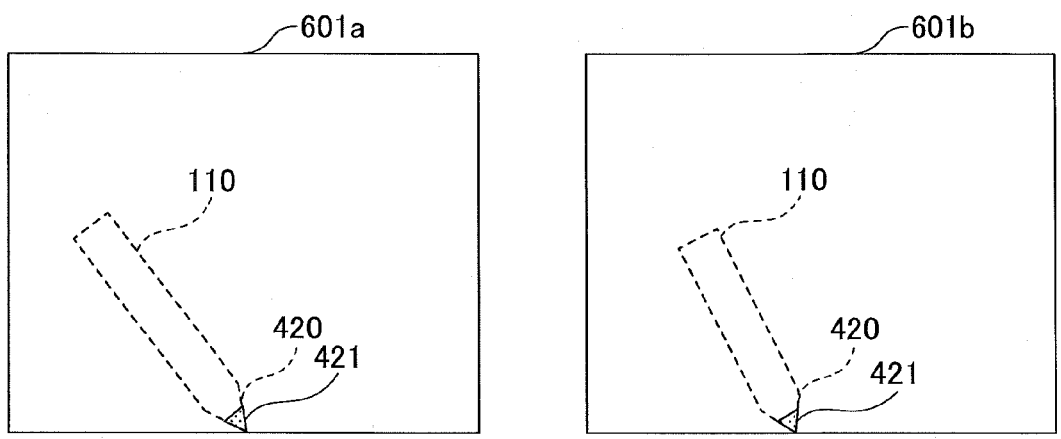
FIG. 6 is a diagram that illustrates one example of a taken image that is taken by a two-dimensional image sensor part of a coordinate detection system.

Next, taken images will be described that are taken by the two-dimensional image sensor parts 103a and 103b. FIG. 6 is a diagram that illustrates one example of taken images that are taken by the two-dimensional image sensor parts 103a and 103b.

In FIG. 6, a taken image 601a is one example of an image taken by the two-dimensional image sensor part 103a and a taken image 601b is one example of an image taken by the two-dimensional image sensor part 103b. As illustrated in FIG. 6, the light emission part 421 of the tip part 420 of the indication tool 110 emits light so that a density difference from an image in a peripheral area is increased with respect to a portion other than the light emission part 421. For this reason, it is possible for the computer 102 to readily sample an image that includes the light emission part 421 of the indication tool 110 from the taken images 601a and 601b.

<Image Processing for an Image that Includes a Light Emission Part>

Figure 7A:
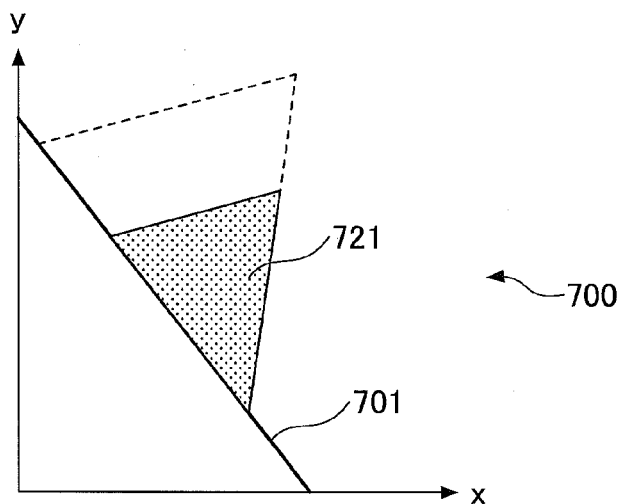
FIG. 7A, FIG. 7B, and FIG. 7C are diagrams for illustrating image processing for an image that includes a light emission part of a tip part of an indication tool.
Figure 7B:
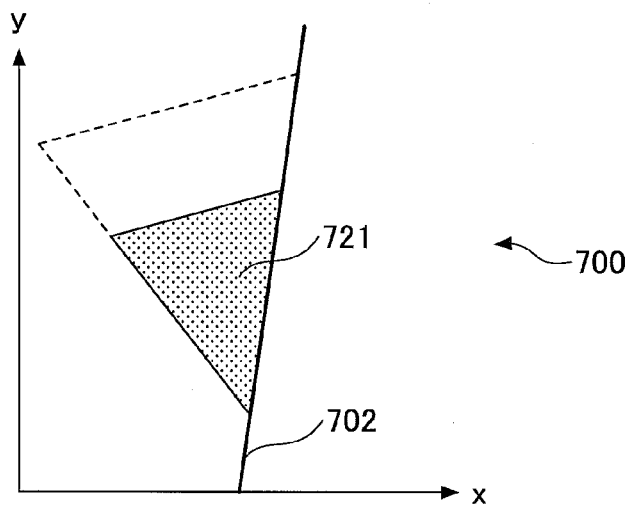
Figure 7C:
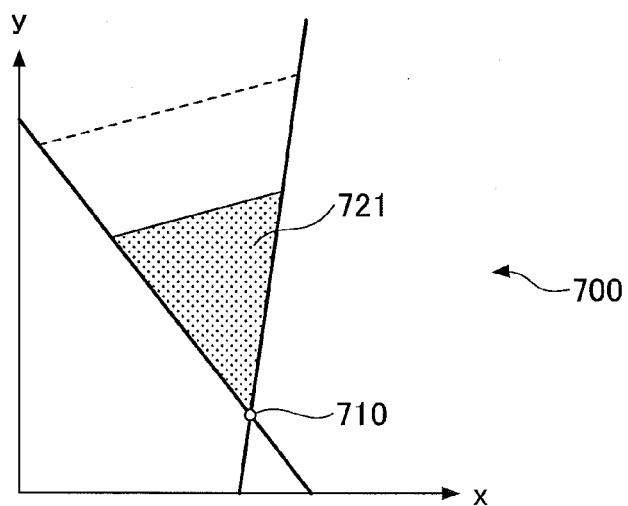

Next, a process for obtaining revolution angles α and β will be described for executing image processing on an image that sampled from each of the taken images 601a and 601b and includes the light emission part 421 of the indication tool 110, so as to calculate that coordinates of the vertex of the tip part 420 on an input surface. FIG. 7A, FIG. 7B, and FIG. 7C are diagrams for illustrating image processing on an image 700 that is sampled form the taken image 601a and includes the light emission part 421 of the indication tool 110, wherein a transverse axis and a longitudinal axis on the image 700 are provided with x-coordinates and y-coordinates, respectively.

As illustrated in FIG. 7A, the light emission part 421 with a conical shape is imaged by the two-dimensional image sensor part 103a, and thereby, rendered as a triangular pixel area 721 on the image 700. Then, a density difference of such a light emission part 421 from an image in a peripheral area is greater than that of a portion other than the light emission part 421.

Hence, edge processing is applied to the triangular pixel area 721 that represents the light emission part 421 on the image 700 to detect outline pixels (pixels that represent a boundary between the light emission part 421 and a peripheral area thereof). Moreover, each detected outline pixel is approximated by a primary expression in accordance with a least square method (that is, an approximated straight line is calculated). Thereby, it is possible to calculate a line that represents an edge portion of the triangular pixel area 721 that represents the light emission part 421 on the image 700.

In FIG. 7A, a line 701 is a primary expression (an extension line that represents a left side edge) that is provided by detecting outline pixels on a left side oblique line of the triangular pixel area 721 that represents the light emission part 421 and approximating such outline pixels in accordance with a least square method.

Furthermore, in FIG. 7B, a line 702 is a primary expression (an extension line that represents a right side edge) that is provided by detecting outline pixels on a right side oblique line of the triangular pixel area 721 that represents the light emission part 421 and approximating such outline pixels in accordance with a least square method.

Herein, the vertex 422 of the tip part 420 of the indication tool 110 is present at a position of a point of intersection between the extension line 701 that represents a left side edge of the light emission part 421 and the extension line 702 that represents a right side edge. That is, an x-coordinate of a point of intersection between the extension line 701 that represents a left side edge and the extension line 702 that represents a right side edge (an x-coordinate on the image 700) is calculated, and thereby, it is possible to calculate a revolution angle of the vertex 422 of the tip portion 420 of the indication tool 110 with respect to a reference direction.

FIG. 7C illustrates a situation such that a point of intersection 710 between the extension line 701 that represents a left side edge and the extension line 702 that represents a right side edge that are obtained from the image 700 is calculated. The point of intersection 710 represents the vertex 422 of the tip part 420 of the indication tool 110.

Herein, a relationship between each position in a direction of an x-axis on the image 700 and a revolution angle with respect to a reference direction is preliminarily set based on a direction of placement of the two-dimensional image sensor part 103a. Thereby, it is possible to obtain a revolution angle α of the vertex 422 of the tip part 420 of the indication tool 110 with respect to a reference direction by calculating an x-coordinate of the point of intersection 710 on the image 700.

Figure 8A:
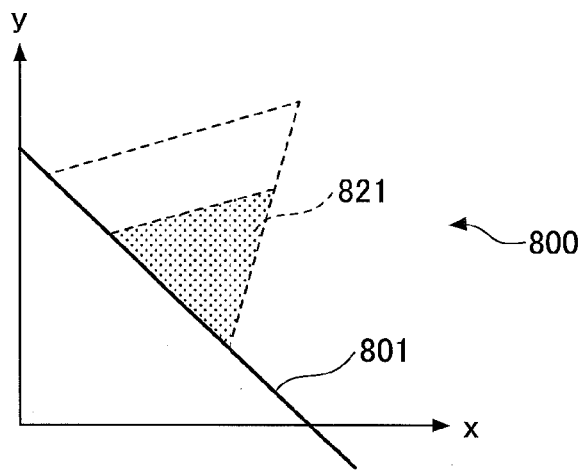
FIG. 8A, FIG. 8B, and FIG. 8C are diagrams for illustrating image processing for an image that includes a light emission part of a tip part of an indication tool.
Figure 8B:
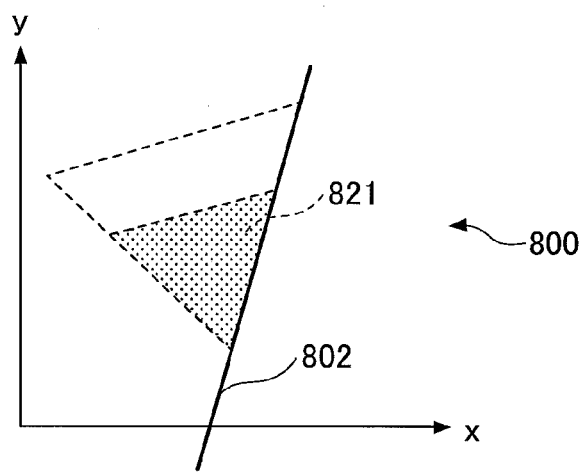
Figure 8C:
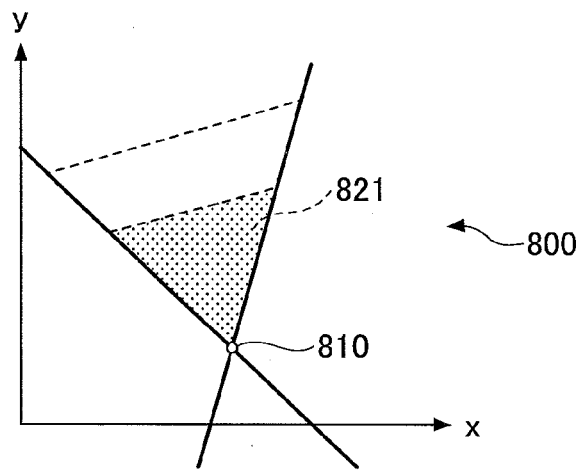

Similarly, FIG. 8A, FIG. 8B, and FIG. 8C are diagrams for illustrating image processing on an image 800 that is sampled form the taken image 601b and includes the light emission part 421 of the indication tool 110, wherein a transverse axis and a longitudinal axis are provided with x-coordinates and y-coordinates, respectively.

As illustrated in FIG. 8A, the light emission part 421 with a conical shape is imaged by the two-dimensional image sensor part 103b, and thereby, rendered as a triangular pixel area 821 on the image 800. Then, a density difference of such a light emission part 421 from an image in a peripheral area is greater than that of a portion other than the light emission part 421.

Hence, edge processing is applied to the triangular pixel area 821 that represents the light emission part 421 on the image 800 to detect outline pixels. Moreover, each detected outline pixel is approximated by a primary expression in accordance with a least square method. Thereby, it is possible to calculate a line that represents an edge portion of the triangular pixel area 821 that represents the light emission part 421 on the image 800.

In FIG. 8A, a line 801 is a primary expression (an extension line that represents a left side edge) that is provided by detecting outline pixels on a left side oblique line of the triangular pixel area 821 that represents the light emission part 421 and approximating such outline pixels in accordance with a least square method.

Furthermore, in FIG. 8B, a line 802 is a primary expression (an extension line that represents a right side edge) that is provided by detecting outline pixels on a right side oblique line of the triangular pixel area 821 that represents the light emission part 421 and approximating such outline pixels in accordance with a least square method.

FIG. 8C illustrates a situation such that a point of intersection 810 between the extension line 801 that represents a left side edge and the extension line 802 that represents a right side edge that are obtained from the image 800 is calculated. The point of intersection 810 represents the vertex 422 of the tip part 420 of the indication tool 110.

Herein, a relationship between each position in a direction of an x-axis on the image 800 and a revolution angle with respect to a reference direction is preliminarily set based on a direction of placement of the two-dimensional image sensor part 103b. Thereby, it is possible to obtain a revolution angle $\beta$ of the vertex 422 of the tip part 420 of the indication tool 110 with respect to a reference direction by calculating an x-coordinate of the point of intersection 810 on the image 800.

<A Flow of an Indication Coordinate Calculation Process>

Figure 9:
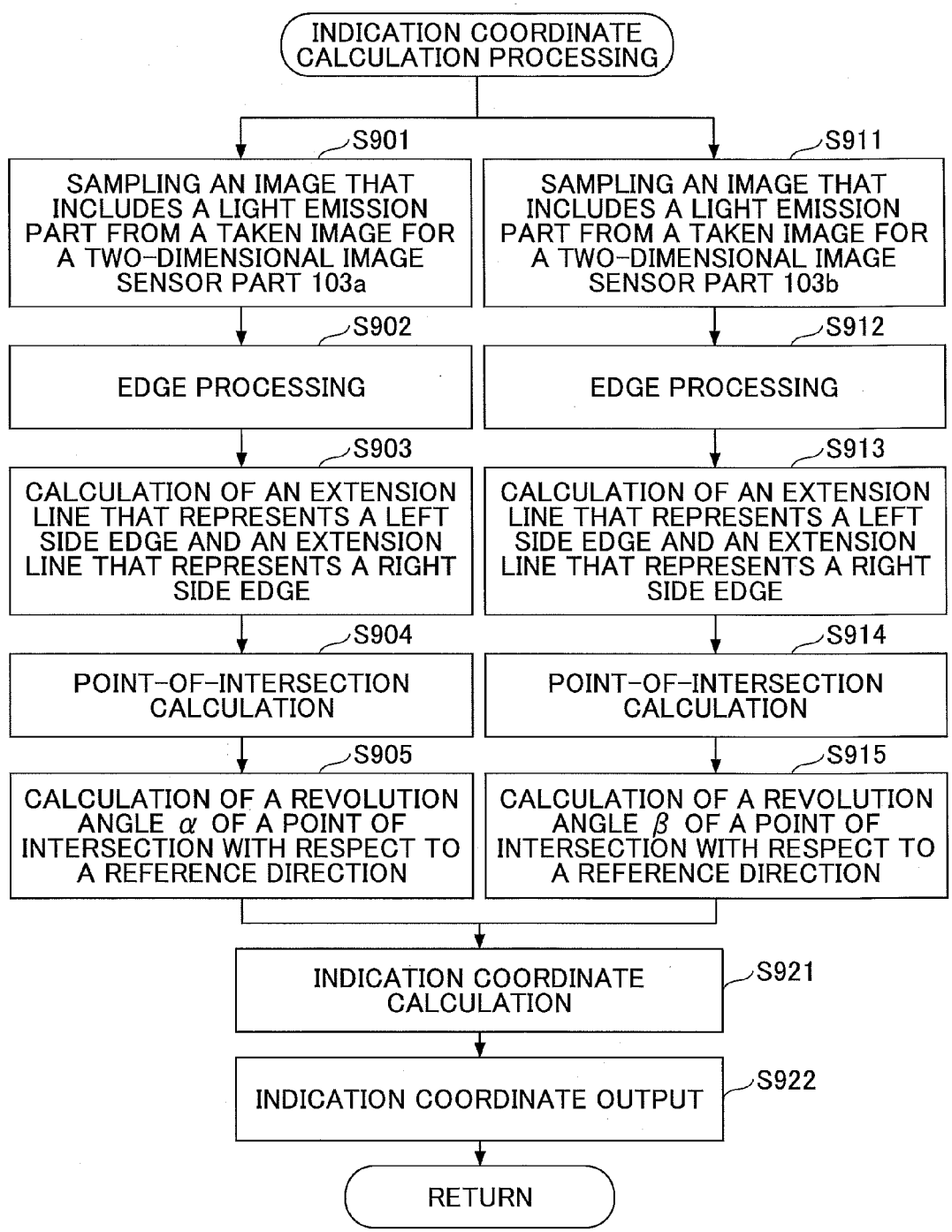
FIG. 9 is a flowchart that illustrates a flow of indication coordinate calculation processing.

Next, a flow of an indication coordinate calculation process in the coordinate detection system 100 will be described. FIG. 9 is a flowchart that illustrates a flow of an indication coordinate calculation process in the coordinate detection system 100. As imaging on the two-dimensional image sensor parts 103a and 103b is started, an indication coordinate calculation process as illustrated in FIG. 9 is executed.

At step S901, the image acquisition part 301 samples the image 700 that includes the light emission part 421 from the taken image 601a that is taken by the two-dimensional image sensor part 103a. At step S902, the vertex detection part 302 applies edge processing to such a sampled image 700 that includes the light emission part 421.

Specifically, a process for detecting outline pixels for respective pixels in an x-direction is executed in such a manner that a pixel at an upper left corner of the image 700 that includes the light emission part 421 is a starting point and the process for detecting outline pixels is executed by reaching a pixel on a right edge, subsequently turning to a left edge, and going by one pixel in a y-direction and on the respective pixels in the x-direction again. Such a scanning procedure is repeated until an end point at a lower right corner of the image 700 that includes the light emission part 421 is reached.

Here, an outline pixel is detected in a case where a total amount of a difference between density values of a subject pixel and a peripheral pixel is greater than or equal to a predetermined threshold.

At step S903, the vertex detection part 302 approximates outline pixels that are obtained by edge processing, by a primary expression in accordance with a least square method, to obtain the extension line 701 that represents a left side edge and the extension line 702 that represents a right side edge.

At step S904, the vertex detection part 302 calculates an x-coordinate of the point of intersection 710 on the image 700 between the extension line 701 that represents a left side edge and the extension line 702 that represents a right side edge that are obtained at step S903. At step S905, the indication coordinate calculation part 320 calculates a revolution angle $\alpha$ with respect to a reference direction from a calculated x-coordinate of the point of intersection 710 on the image 700.

Similarly, at step S911, the image acquisition part 311 samples the image 800 that includes the light emission part 421 from the taken image 601b that is taken by the two-dimensional image sensor part 103b. At step S912, the vertex detection part 312 applies edge processing to such a sampled image 800 that includes the light emission part 421.

At step S913, outline pixels obtained by edge processing are approximated by a primary expression in accordance with a least square method to obtain the extension line 801 that represents a left side edge and the extension line 802 that represents a right side edge.

At step S914, the vertex detection part 312 calculates an x-coordinate of the point of intersection 810 on the image 800 between the extension line 801 that represent a left side edge and the extension line 802 that represent a right side edge that are obtained at step S913. At step S915, the indication coordinate calculation part 320 calculates a revolution angle $\beta$ with respect to a reference direction from a calculated x-coordinate of the point of intersection 810 on the image 800.

At step S921, the indication coordinate calculation part 320 substitutes a revolution angle $\alpha$ and a revolution angle $\beta$ into formula 3 and formula 4 to calculate an x-coordinate and a y-coordinate of the vertex 422 (coordinates indicated by the indication tool 110) on an input surface of the coordinate input device 101. At step S922, the indication coordinate output device 321 outputs a calculated x-coordinate and y-coordinate.

The aforementioned process is repeated for each taken image until imaging by the two-dimensional image sensor parts 103a and 103b are ended. Thereby, it is possible to display, for example, a content that is handwritten and inputted by using the indication tool 110, on the coordinate input device 101 in a real time.

<A Robustness of a Coordinate Detection System>

Next, a robustness of the coordinate detection system 100 according to the present embodiment will be described. For calculating coordinates of the vertex 422 on an input surface (coordinates calculated based on revolution angles $\alpha$ and $\beta$) as described above, it is important to reliably sample the points of intersection 710 and 810 on the images 700 and 800, respectively, independently of external disturbance.

Herein, an indication coordinate calculation process as described above (FIG. 9) calculates the extension line 701 that represents a left side edge and the extension line 801 that represents a right side edge for calculating the points of intersection 710 and 810. As described above, each of the extension line 701 that represents a left side edge and the extension line 801 that represents a right side edge is obtained by approximating outline pixels detected in edge processing, by a primary expression, by using a least square method.

That is, if it is possible to detect outline pixels in edge processing (if it is possible to detect at least two or more outline pixels), it is possible to calculate an extension line that represents a left side edge and an extension line that represents a right side edge. For this reason, for example, even when the indication tool 110 is present near the two-dimensional image sensor part 103a as illustrated in FIG. 10A and thereby focusing is not attained so that the taken image 601a is a blurred image, it is possible to execute edge processing to detect outline pixels. Then, it is possible to obtain an extension line that represents a left side edge and an extension line that represents a right side edge and thereby calculate coordinates of the vertex 422 on an input surface.

Figure 10B:
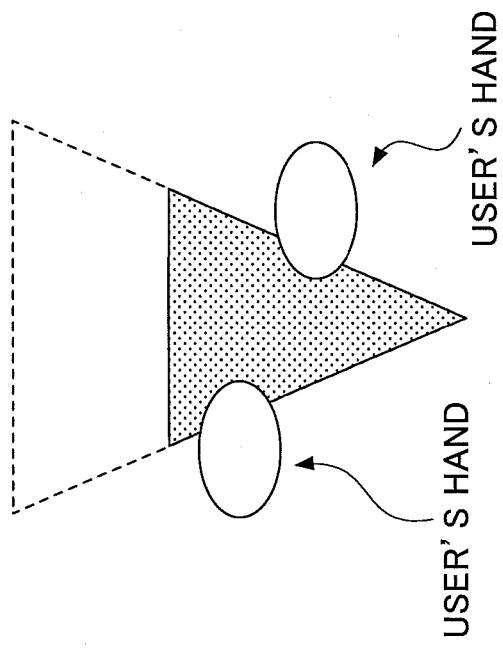
FIG. 10A and FIG. 10B are diagrams for illustrating a robustness of a coordinate detection system.
Figure 10A:
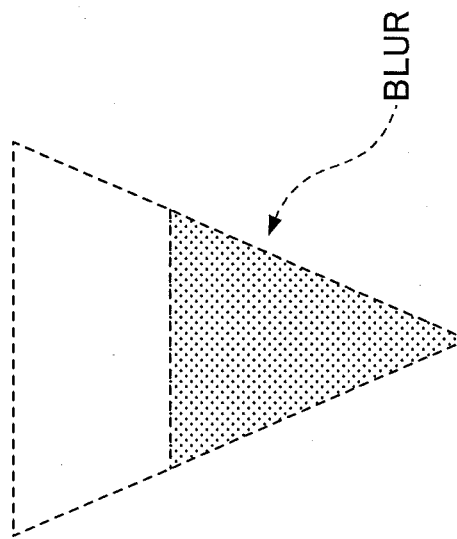

Alternatively, even when a portion of the tip part 420 is covered by a hand of a user or the like as illustrated in FIG. 10B, it is possible to calculate the extension lines 701 and 801 that represent a left side edge and the extension lines 702 and 802 that represent a right side edge based on an area that is not covered thereby. That is, it is possible to calculate coordinates of the vertex 422 on an input surface.

As a result, it is not necessary for a user to be careful in such a manner that an input of a handwritten character or the like is executed in an area distant from a two-dimensional image sensor part when being executed on an input surface, and it is possible to execute an input at an arbitrary position on an input surface. Furthermore, it is not necessary to be careful in such a manner that the light emission part 421 is blocked when the indication tool 110 is held, and it is possible to attain holding in accordance with a natural holding method.

Thus, the coordinate detection system 100 according to the present embodiment provides a good operability for a user, because the coordinate detection system 100 is robust against external disturbance that may be caused therein.

<A Summary>

As is clear from the descriptions provided above, a coordinate detection system according to the present embodiment is:

configured in such a manner that a tip part of an indication tool has a conical shape and configured in such a manner that a light emission part is provided thereon;

configured in such a manner that at least two two-dimensional image sensor parts are disposed as a configuration for calculating coordinates of a vertex of a tip part of an indication tool;

configured in such a manner that an image that includes a light emission part is sampled from a taken image that is taken by each of two-dimensional image sensor parts and edge processing is executed to detect outline pixels so that an extension line that represents a left side edge and an extension line that represents a right side edge are calculated;

configured in such a manner that an x-coordinate of a point of intersection between an extension line that represents a left side edge and an extension line that represents a right side edge is calculated from a taken image that is taken by each of two-dimensional image sensor parts and a revolution angle of such a point of intersection with respect to a reference direction is calculated based on such an x-coordinate; and configured in such a manner that coordinates of a vertex of a tip part of an indication tool (coordinates indicated by an indication tool) on an input surface of a coordinate input device are calculated based on a calculated revolution angle.

Thereby, it is possible to realize a coordinate detection system that is robust against external disturbance. As a result, it is possible to improve an operability of an indication tool in a coordinate detection system.

A Second Embodiment

Although the first embodiment described above is configure in such a manner that a tip part of an indication tool has a conical shape and a light emission part is disposed at a tip side, an embodiment of the present invention is not limited thereto. A tip part of an indication tool may have another configuration as long as it is possible to calculate a point of intersection between an extension line that represents a left side edge and an extension line that represents a right side edge based thereon. Hence, in the present embodiment, a light emission part is disposed in a middle of a tip part of an indication tool and the light emission part is formed into a truncated-conical shape. A detail of the present embodiment will described below.

<A Configuration of an Indication Tool>

Figure 11:
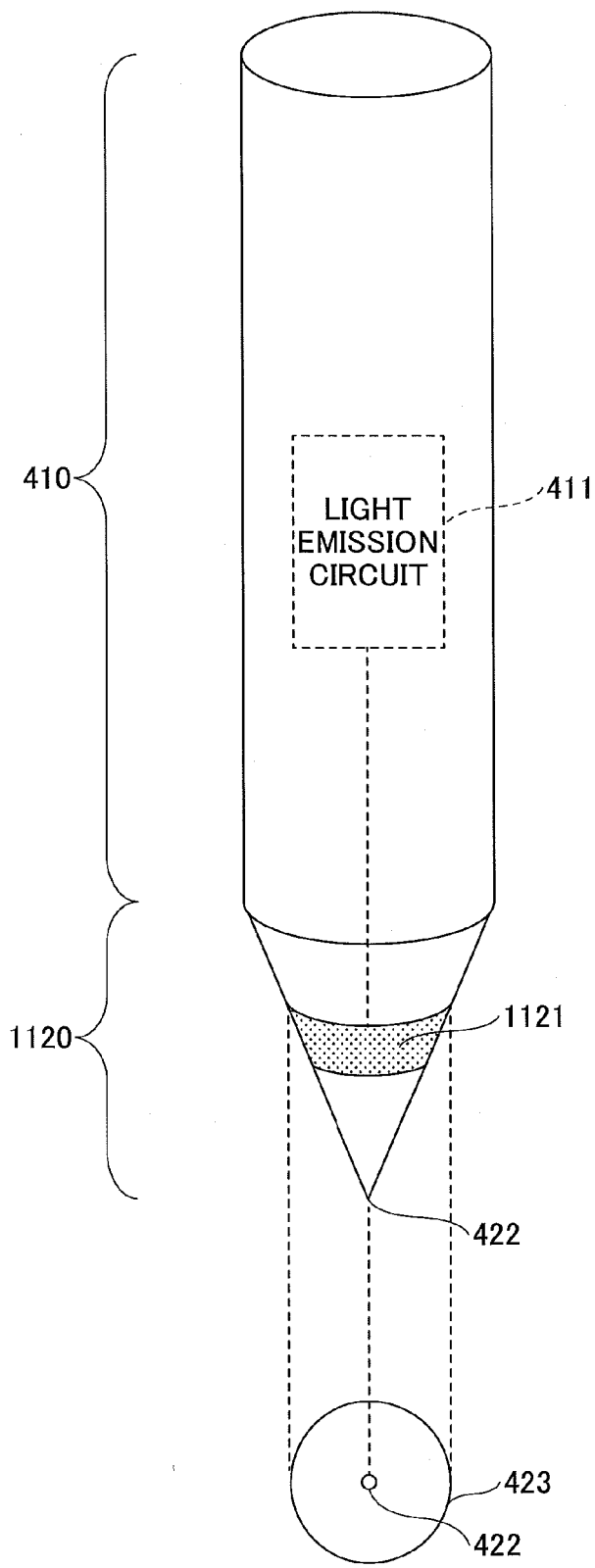
FIG. 11 is a diagram that illustrates another configuration of an indication tool.

FIG. 11 is a diagram that illustrates a configuration of an indication tool 1100. Here, a configuration similar to that of the indication tool 110 illustrated in FIG. 4 in a configuration of the indication tool 1100 illustrated in FIG. 11 will be provided with an identical reference numeral and a description thereof will be described herein.

A difference from FIG. 4 is a light emission part 1121. As illustrated in FIG. 11, the present embodiment is configured in such a manner that the light emission part 1121 is disposed not at a tip side of a tip part 1120 with a conical shape but at a middle position thereof. For this reason, the light emission part 1121 has a truncated-conical shape.

That is, the light emission part 1121 composes a portion of the tip part 1120 that has a conical shape and is configured in such a manner that it is possible to identify a position of the vertex 422 of the tip part 1120 due to an inclination of a side surface thereof.

<Image Processing for a Light Emission Part>

Figure 12A:
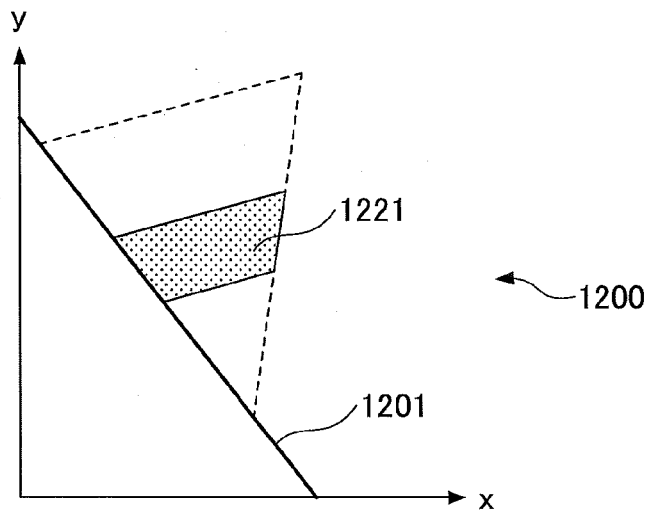
FIG. 12A, FIG. 12B, and FIG. 12C are diagrams for illustrating image processing for an image that includes a light emission part of a tip part of an indication tool.
Figure 12B:
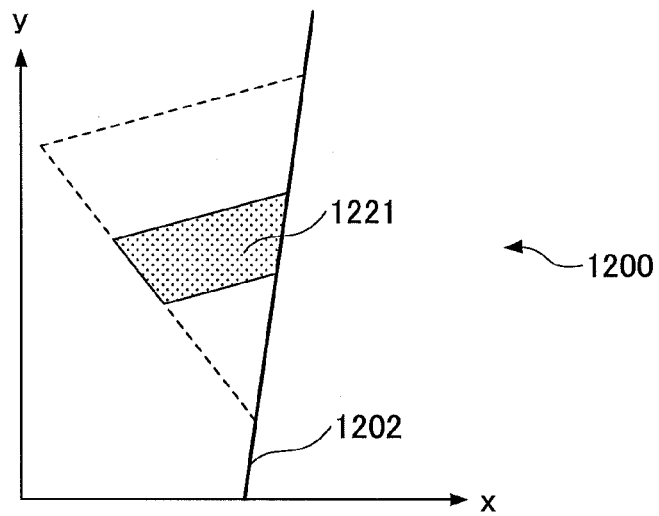
Figure 12C:
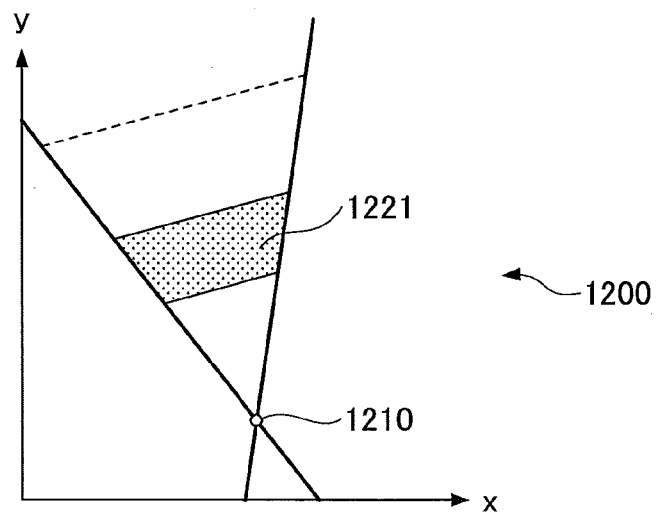

Next, a process will be described for applying image processing to an image that is sampled from each of the taken images 601a and 601b and includes the light emission part 1121 of the indication tool 1100 and obtaining a revolution angle for calculating coordinates of the vertex 422 of the tip part 1120 on an input surface. FIG. 12A, FIG. 12B, and FIG. 12C are diagrams for illustrating image processing for an image 1200 that is sampled from the taken image 601a and includes the light emission part 1121 of the indication tool 1100, wherein a transverse axis and a longitudinal axis are provided with x-coordinates and y-coordinates, respectively.

As illustrated in FIG. 12A, the light emission part 1121 with a truncated-conical shape is imaged by the two-dimensional image sensor part 103a and thereby rendered as a trapezoidal pixel area 1221 on the image 1200. Then, a density difference of such a light emission part 1121 from an image on a peripheral area is greater than a portion other than the light emission part 1121.

Hence, edge processing is applied to the trapezoidal pixel area 1221 that represents the light emission part 1121 in the image 1200 to detect outline pixels. Moreover, respective detected outline pixels are approximated by a primary expression in accordance with a least square method. Thereby, it is possible to calculate a line that represents an edge portion of the trapezoidal pixel area 1221 that represents the light emission part 421 in the image 1200.

In FIG. 12A, a line 1201 is a primary expression provided by detecting outline pixels of a left side oblique line of the trapezoidal pixel area 1221 that represents the light emission part 1121 and approximating such outline pixels in accordance with a least square method (an extension line that represents a left side edge).

Furthermore, in FIG. 12B, a line 1202 is a primary expression provided by sampling a right side oblique line of the trapezoidal pixel area 1221 that represents the light emission part 1121 and approximating such outline pixels in accordance with a least square method (an extension line that represents a right side edge).

Moreover, FIG. 12C illustrates a situation such that a point of intersection 1210 between the extension line 1201 that represent a left side edge and the extension line 1202 that represents a right side edge that are obtained from the image 1200 is calculated. The point of intersection 1210 represents the vertex 422 of the tip part 1120 of the indication tool 1100.

Herein, a relationship between each position on the image 1200 in a direction of an x-axis and a revolution angle with respect to a reference direction is preliminarily set based on a direction of placement of the two-dimensional image sensor part 103*a*. Thereby, it is possible to calculate an x-coordinate of the point of intersection 1210 in the image 1200 and thereby obtain a revolution angle α of the vertex 422 of the tip part 1120 of the indication tool 1100 with respect to a reference direction.

Figure 13A:
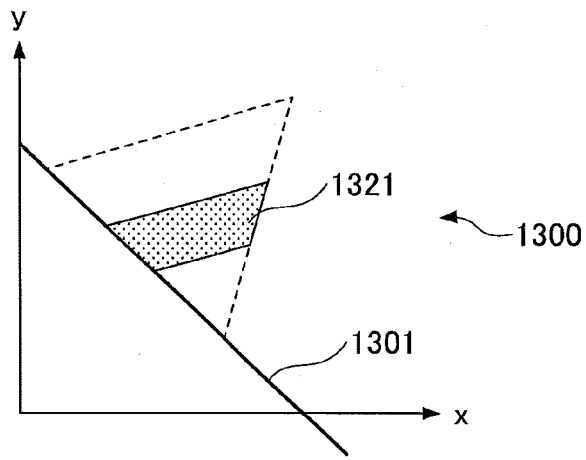
FIG. 13A, FIG. 13B, and FIG. 13C are diagrams for illustrating image processing for an image that includes a light emission part of a tip part of an indication tool.
Figure 13B:
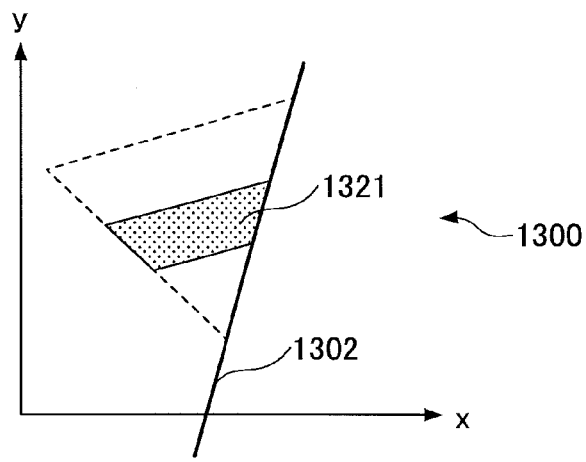
Figure 13C:
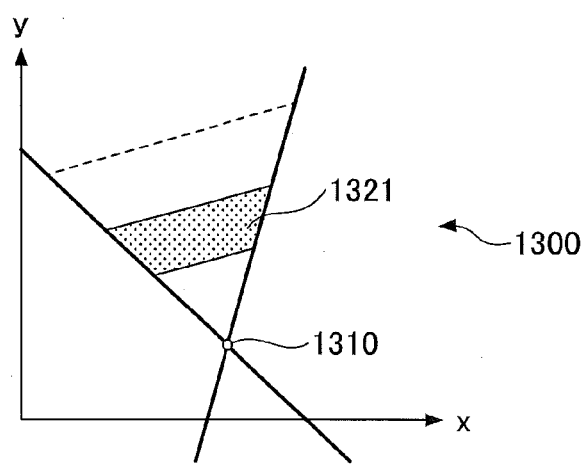

Similarly, FIG. 13A, FIG. 13B, and FIG. 13C are diagrams for illustrating image processing for an image 1300 that is sampled from the taken image 601*b* and includes the light emission part 1121 of the indication tool 1100, wherein a transverse axis and a longitudinal axis are provided with x-coordinates and y-coordinates, respectively.

As illustrated in FIG. 13A, the light emission part 1121 with a truncated-conical shape is imaged by the two-dimensional image sensor part 103*b* and thereby rendered as a trapezoidal pixel area 1321 on the image 1300. Then, a density difference of such a light emission part 1121 from an image on a peripheral area is greater than a portion other than the light emission part 1121.

Hence, edge processing is applied to the trapezoidal pixel area 1321 that represents the light emission part 1121 in the image 1300 to detect outline pixels. Moreover, respective detected outline pixels are approximated by a primary expression in accordance with a least square method. Thereby, it is possible to calculate a line that represents an edge of a trapezoid that represents the light emission part 1221 in the image 1300.

In FIG. 13A, a line 1301 is a primary expression provided by detecting outline pixels of a left side oblique line of the trapezoidal pixel area 1321 that represents the light emission part 1121 and approximating such outline pixels in accordance with a least square method (an extension line that represents a left side edge).

Furthermore, in FIG. 13B, a line 1302 is a primary expression provided by detecting outline pixels of a right side oblique line of the trapezoidal pixel area 1321 that represents the light emission part 1121 and approximating such outline pixels in accordance with a least square method (an extension line that represents a right side edge).

Moreover, FIG. 13C illustrates a situation such that a point of intersection 1310 between the extension line 1301 that represent a left side edge and the extension line 1302 that represents a right side edge that are obtained from the image 1300 is calculated. The point of intersection 1310 represents the vertex 422 of the tip part 1120 of the indication tool 1100.

Herein, a relationship between each position on the image 1300 in a direction of an x-axis and a revolution angle with respect to a reference direction is preliminarily set based on a direction of placement of the two-dimensional image sensor part 103*b*. Thereby, it is possible to calculate an x-coordinate of the point of intersection 1310 in the image 1300 and thereby obtain a revolution angle β of the vertex 422 of the tip part 1120 of the indication tool 1100 with respect to a reference direction.

<A Summary>

As is clear from the descriptions provided above, a coordinate detection system according to the present embodiment is:

configured in such a manner that a tip part of an indication tool has a conical shape and configured in such a manner that a light emission part is provided at a middle position thereof;

configured in such a manner that at least two two-dimensional image sensor parts are disposed as a configuration for calculating coordinates of a vertex of a tip part of an indication tool;

configured in such a manner that an image that includes a light emission part is sampled from a taken image that is taken by each of two-dimensional image sensor parts and edge processing is executed to detect outline pixels so that an extension line that represents a left side edge and an extension line that represents a right side edge are calculated;

configured in such a manner that an x-coordinate of a point of intersection between an extension line that represents a left side edge and an extension line that represents a right side edge is calculated from a taken image that is taken by each of two-dimensional image sensor parts and a revolution angle of such a point of intersection with respect to a reference direction is calculated based on such an x-coordinate; and configured in such a manner that coordinates of a vertex of a tip part of an indication tool on an input surface of a coordinate input device are calculated based on a calculated revolution angle.

Thereby, it is possible to realize a coordinate detection system that is robust against external disturbance. As a result, it is possible to improve an operability of an indication tool in a coordinate detection system.

Here, as is clear from the descriptions provided above, it is possible to calculate coordinates of a vertex according to the present embodiment even when the vertex 422 of the tip part 1120 of the indication tool 1100 is outside an angle of view of the two-dimensional image sensor part 103*a* or 103*b*.

A Third Embodiment

Although the first embodiment described above is configured in such a manner that a tip part of an indication tool has a conical shape, an embodiment of the present invention is not limited thereto. For example, as illustrated in FIG. 14A, a tip part 1420 of an indication tool 1400 may be configured to have a truncated-conical shape and also configured to dispose the light emission part 1121 thereon. Moreover, a configuration may be such that a vertex 1422 of the tip part 1420 is arranged at a position where an extension line of an oblique line 1411 and an extension line of an oblique line 1412 intersect that represent inclinations of a side surface of the light emission part 1211 with a truncated-conical shape. That is, a configuration may be such that it is possible to identify a position of the vertex 1422 of the tip part 1420 due to an inclination of a side surface of the light emission part 1211.

Thereby, it is possible to execute an indication coordinate calculation process similar to that of the first embodiment described above and thereby calculate coordinates of the vertex 1422. That is, it is possible to enjoy an effect similar to that of the first embodiment described above.

Here, the vertex 1422 may further be configured in such a manner that a protection member is installed thereon in order to prevent wearing involved by contacting an input surface. In this case, a configuration is such that a vertex on a condition that a protection member is installed thereon is at a position where an extension line of the oblique line 1411 and an extension line of the oblique line 1412 of a truncated-conical shape intersect.

Furthermore, although the first embodiment described above is configured in such a manner that only one light emission part is provided at a tip part of an indication tool, an embodiment of the present invention is not limited thereto and may be configured in such a manner that two or more light emission parts are provided in a direction of a longitudinal axis thereof.

FIG. 14B illustrates a case where a tip part 1440 of an indication tool 1430 is configured to have a conical shape and light emission parts 1441 and 1442 are provided at two positions in a direction of a longitudinal axis of the tip part. Because it is also possible to calculate an extension line that represents a left side edge and an extension line that represents a right side edge from a taken image in a case of FIG. 14B, it is possible to calculate coordinates of the vertex 422 in accordance with a similar process.

A Fourth Embodiment

Although each embodiment described above is configured in such a manner that a light emission part is provided at a tip part of an indication tool, an embodiment of the present invention is not limited thereto. A configuration is not limited to a light emission part as long as it is possible to identify a conical shape or a truncated-conical shape for identifying a position of a vertex of an indication tool, on a tip part of the indication tool, in a taken image. For example, a coating with a predetermined color may be applied to a part with such a conical shape or a truncated-conical shape or a part with such a conical shape or a truncated-conical shape may be formed of a predetermined material.

A Fifth Embodiment

Although a method for determining whether or not a tip part of an indication tool contacts an input surface is not particularly referred to in each embodiment described above, determination for whether or not a tip part of an indication tool contacts an input surface may be, for example, configured to be determination based on a y-coordinate of a point of intersection calculated from a taken image.

Specifically, determination is such that a tip part of an indication tool contacts an input surface in a case where a y-coordinate of a point of intersection calculated from the image 700 or the like is equal to a value for representing an input surface (for example, zero) and a y-coordinate of a point of intersection calculated from the image 800 or the like is equal to a value that represents an input surface (for example, zero).

Alternatively, determination is such that a tip part of an indication tool contacts an input surface in a case where either one of a y-coordinate of a point of intersection calculated from the image 700 or the like or a y-coordinate of a point of intersection calculated from the image 800 or the like is equal to a value for representing an input surface (for example, zero).

A Sixth Embodiment

Although each embodiment described above describes a case where a vertex of a tip part of an indication tool contacts an input surface, an embodiment of the present invention is not limited thereto. For example, in a case where a tip part of an indication tool has a hemispherical shape, a tip part contacts an input surface at a position displacing from a vertex thereof. In this case, according to an indication coordinate calculation process in each embodiment described above, content is displayed that is handwritten or inputted, not at a position where a tip part of an indication tool contacts actually, but at a position of a vertex of a tip part.

This is because coordinates of a vertex of a tip part are identified as indicated coordinates (indication coordinates) in a case of an indication coordinate calculation process in each embodiment described above. Here, in a case where a displacement is thus caused between a contact position and an indication position, a user has a feeling of strangeness at a time of a handwriting input.

Hence, a sixth embodiment describes a configuration for reducing a displacement between a contact position and an indication position that is caused in a case where a tip part of an indication tool has a hemispherical shape.

<A Configuration of an Indication Tool>

Figure 15:
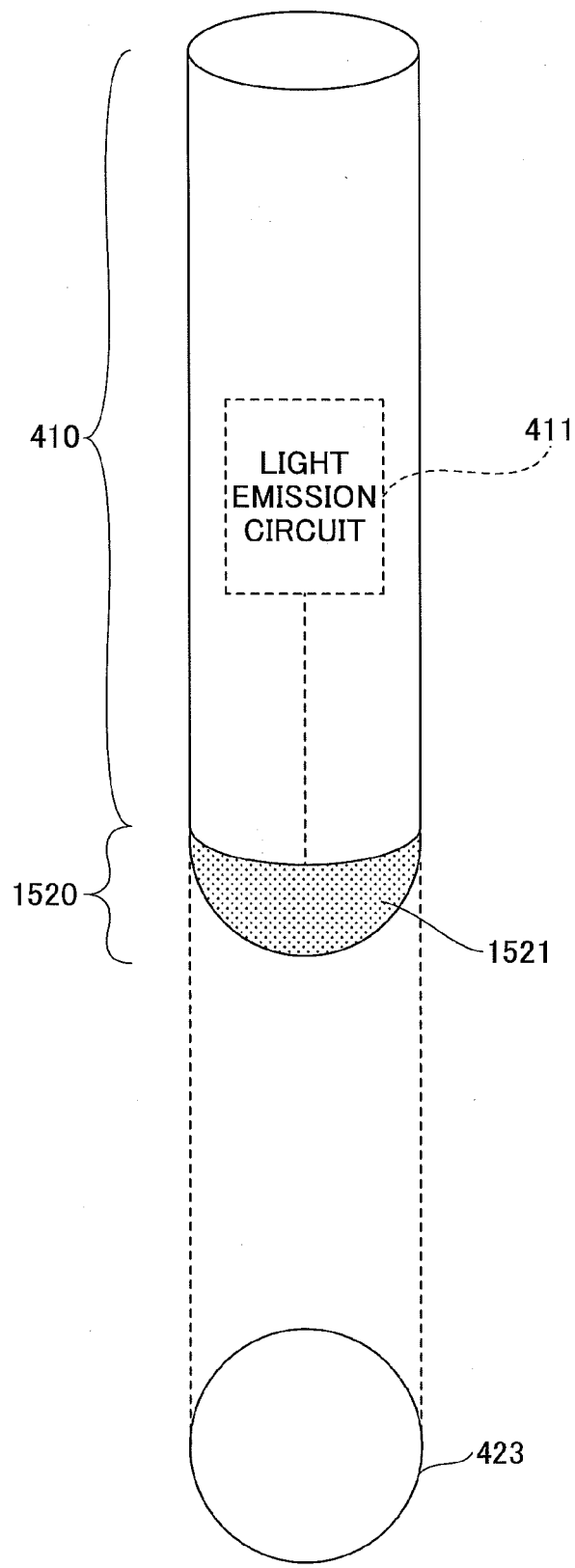
FIG. 15 is a diagram that illustrates another configuration of an indication tool.

First, a configuration of an indication tool according to the sixth embodiment will be described. FIG. 15 is a diagram that illustrates an indication tool 1500 according to the sixth embodiment. As illustrated in FIG. 15, the indication tool 1500 is such that a tip part 1520 is composed of a light emission part 1521 that has a hemispherical shape.

<A Functional Configuration of an Information Processing Device>

Figure 16:
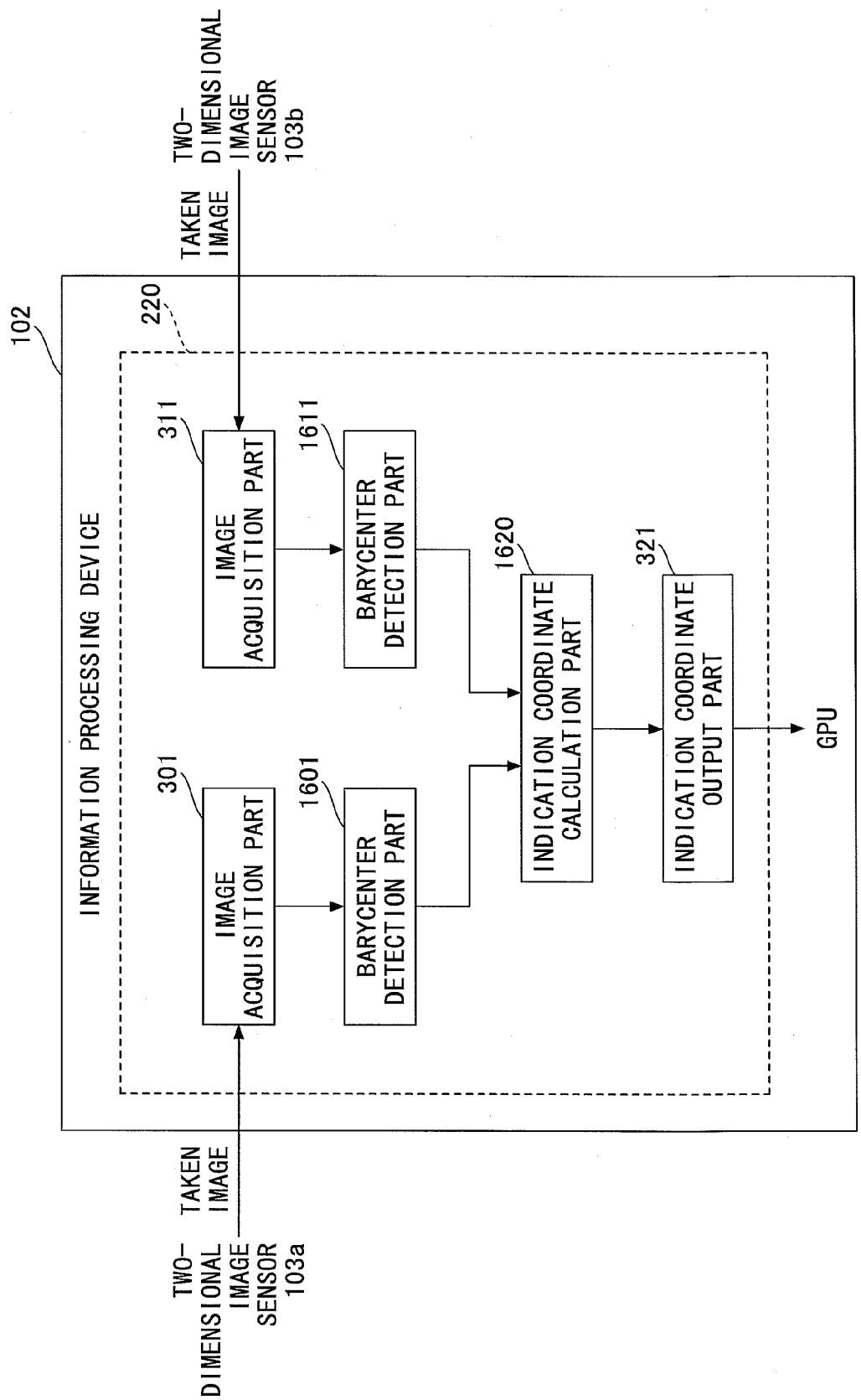
FIG. 16 is a functional configuration diagram that illustrates a function that is realized in an information processing device.

Next, a functional configuration of the computer (information processing device) 102 will be described in a case where indication on an input surface is executed by using the indication tool 1500. FIG. 16 is a functional configuration diagram that illustrates a function to be realized in the information processing device 102.

Here, a component in the functional configuration diagram illustrated in FIG. 16 being identical to a component included in the functional configuration diagram illustrated in FIG. 3 is provided with an identical reference numeral and a description thereof will be omitted. A difference from FIG. 3 is barycenter detection parts 1601 and 1611 and an indication coordinate calculation part 1620.

The barycenter detection parts 1601 and 1611 detect a barycenter of an image area that represents a hemispherical shape of a tip part of the indication tool 1500, from taken images that are acquired by the image acquisition parts 301 and 311, respectively.

The indication coordinate calculation part 1620 calculates coordinates indicated by the indication tool 110 on an input surface of the coordinate input device 101 based on a position of a barycenter of an image area that is detected from a taken image and represents a hemispherical shape of a tip part of the indication tool 1500.

<Image Processing for a Light Emission Part>

Figure 17A:
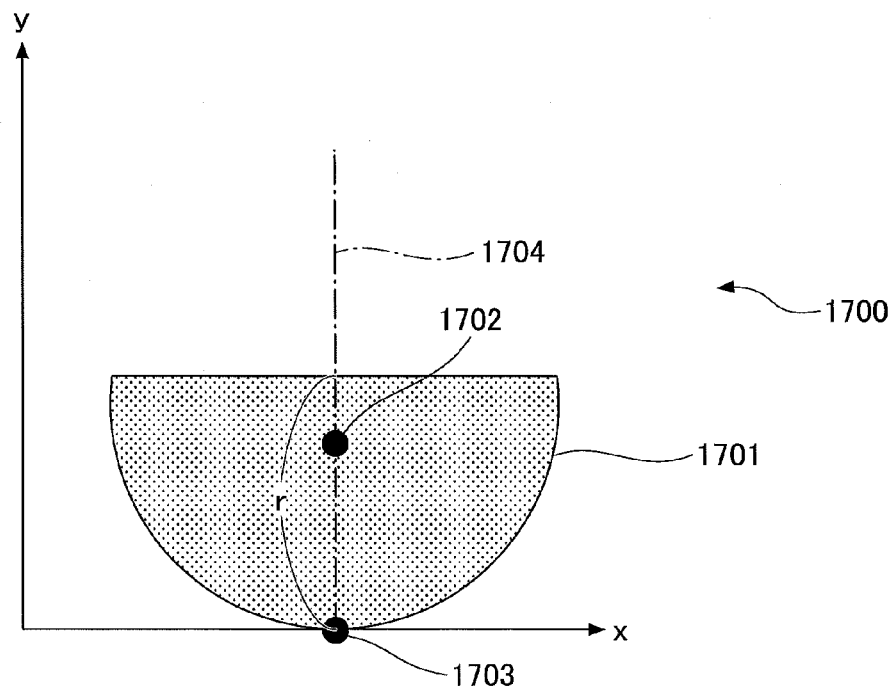
FIG. 17A and FIG. 17B are diagrams for illustrating image processing for an image that includes a light emission part of a tip part of an indication tool.
Figure 17B:
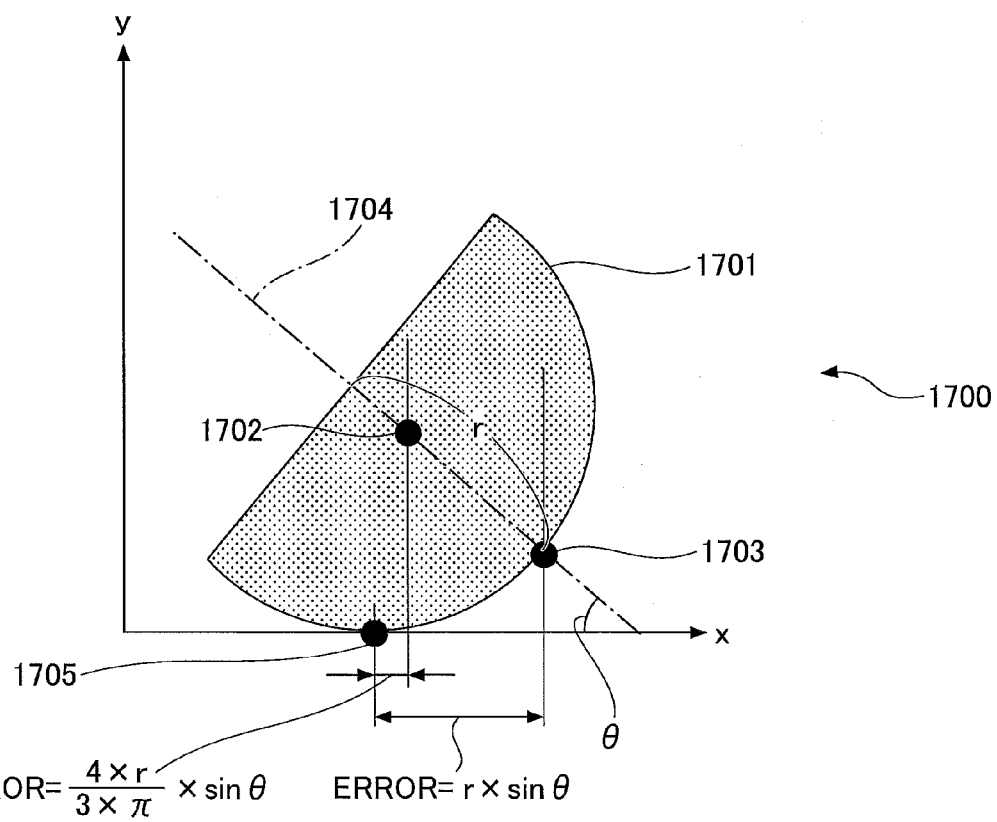

Next, image processing will be described that is applied to an image that is sampled from each of the taken images 601a and 601b and includes the light emission part 1521 of the indication tool 1500. FIG. 17A and FIG. 17B are diagrams for illustrating image processing for an image 1700 that is sampled from a taken image 601a and includes the light emission part 1521 of the indication tool 1500.

As illustrated in FIG. 17A, the light emission part 1521 that has a hemispherical shape is imaged by the two-dimensional image sensor part 103a and thereby rendered as a hemispherical image area 1701 on the image 1700.

The barycenter detection part 1601 calculates coordinates of a barycenter 1702 of such a hemispherical image area 1701 on the image 1700. Here, it is possible to calculate coordinates G of the barycenter 1702 in accordance with the following formula (formula 5):

$$G = \frac{\sum_{i,j \in \Omega} p_{ij}}{\sum_{i,j \in \Omega} 1} \quad \text{(Formula 5)}$$

by using coordinates of each pixel that composes the hemispherical image area 1701.

Herein, $P_{ij}$ denotes coordinates of each pixel that composes the hemispherical image area 1701 and Q denotes the image area 1701 that is composed of pixels that have a brightness value greater than or equal to a predetermined brightness threshold. That is, it is possible to obtain coordinates G of the barycenter 1702 based on an average value of coordinates of respective pixels that are included in the hemispherical pixel area 1701.

Furthermore, it is also possible to calculate coordinates G of the barycenter 1702 in accordance with the following formula (formula 6):

$$G = \frac{\sum_{i,j \in \Omega} ((B_{ij} - Th) p_{ij})}{\sum_{i,j \in \Omega} (B_{ij} - Th)} \quad \text{(Formula 6)}$$

by using coordinates of each pixel that composes the hemispherical pixel area 1701 and a brightness value of each pixel.

Herein, $B_{ij}$ denotes a brightness value of each pixel included in the hemispherical pixel area 1701 and Th denotes a brightness threshold. That is, it is possible to obtain coordinates G of the barycenter 1702 based on an average value of products of a value that is obtained by subtracting a predetermined brightness threshold from a brightness value of each pixel included in the hemispherical pixel area 1701 and coordinates of each pixel included in the hemispherical pixel area 1701.

Herein, in a case where a center line 1704 of the indication tool 1500 is orthogonal to an x-axis as illustrated in FIG. 17A (that is, in a case where the indication tool 1500 is held perpendicularly to an input surface), a vertex of the light emission part 1521 contacts an input surface. For this reason, an x-coordinate of a contact position of the light emission part 1521 and an input surface, an x-coordinate of a vertex 1703 of the pixel area 1701, and an x-coordinate of the barycenter 1702 of the pixel area 1701 are identical.

On the contrary, in a case where the center line 1704 of the indication tool 1500 has an angle θ with respect to an x-axis as illustrated in FIG. 17B (that is, in a case where the indication tool 1500 is held obliquely with respect to an input surface), the light emission part 1521 and an input surface contact at a position 1705. In this case, a distance d between an x-coordinate of the vertex 1703 of the pixel area 1701 and an x-coordinate of the position 1705 is d=r×sin θ wherein r is a radius of the pixel area 1701. For this reason, if indication coordinates are calculated based on an x-coordinate of the vertex 1703 of the pixel area 1701, an error of a distance d=r×sin θ is included with respect to an actual contact position.

On the other hand, a distance d between an x-coordinate of the barycenter 1702 of the pixel area 1701 and an x-axis of the position 1705 is d=(4×r×sin θ)/(3×η). For this reason, in a case where indication coordinates are calculated based on an x-coordinate of the barycenter 1702 of the light emission part 1521, an error of a distance d=(4×r×sin θ)/(3×π) is included with respect to an actual contact position.

That is, it is possible to reduce an error with respect to an actual contact position in a case where indication coordinates are calculated based on an x-axis of the barycenter 1702 of the pixel area 1701, as compared with a case where indication coordinates are calculated based on an x-axis of the vertex 1703 of the pixel area 1701.

Thus, in a case where a tip part of the indication tool 1500 has a hemispherical shape, it is possible to mitigate a feeling of strangeness at a time of an handwriting input by calculating an x-coordinate of the barycenter 1702 of a hemispherical pixel area rendered on the image 1700 and calculating indication coordinates based on such a coordinate.

Hence, in the present embodiment, the barycenter detection part 1601 calculates an x-coordinate of the barycenter 1702 based on the above-formula (formula 5 or formula 6). Then, the indication coordinate calculation part 1620 obtains a revolution angle α based on an x-coordinate of such a calculated barycenter 1702. Here, a relationship between each position on the image 1700 in a direction of an x-axis and a revolution angle with respect to a reference direction in the present embodiment is also preliminarily set based on a direction of placement of the two-dimensional image sensor part 103a.

Figure 18:
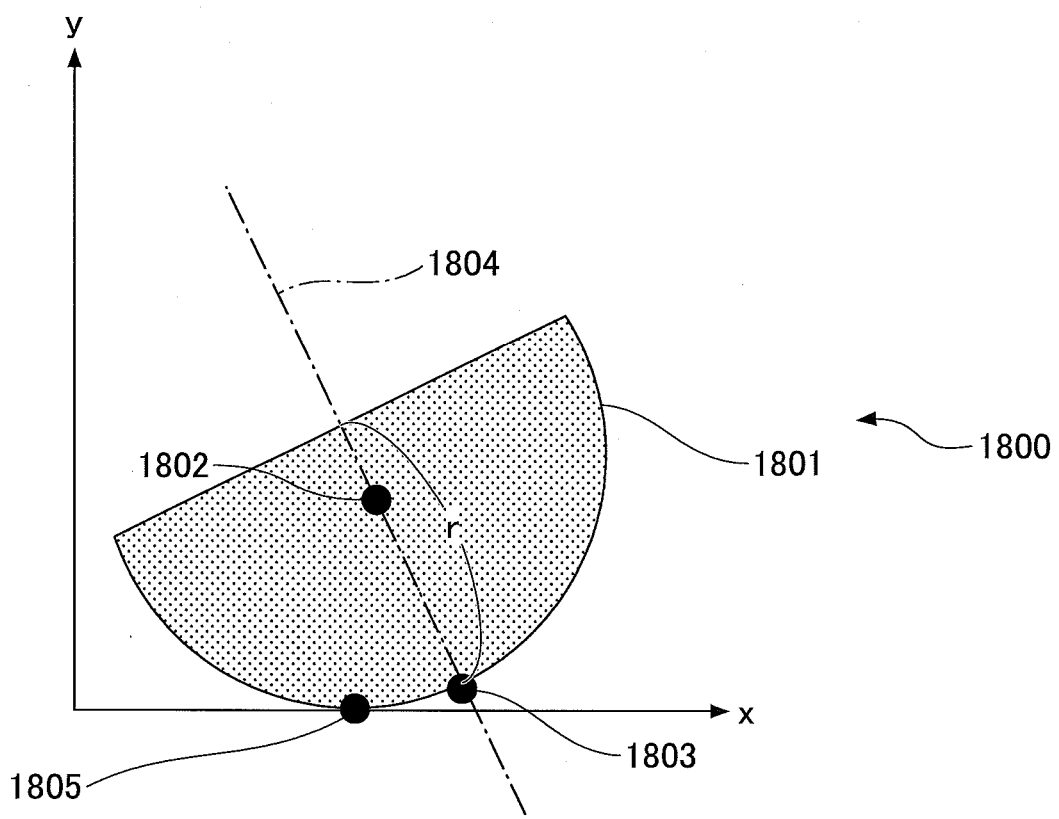
FIG. 18 are diagrams for illustrating image processing for an image that includes a light emission part of a tip part of an indication tool.

Similarly, FIG. 18 is a diagram for illustrating image processing for an image 1800 that is sampled from the taken image 601b and includes the light emission part 1521 of the indication tool 1500. As illustrated in FIG. 18, the light emission part 1521 that has a hemispherical shape is imaged by the two-dimensional image sensor part 103b and rendered as a hemispherical pixel area 1801 on the image 1800.

Herein, the barycenter detection part 1611 calculates an x-coordinate of the barycenter 1802 of the pixel area 1801 by using the above formula (formula 5 or formula 6). Then, the indication coordinate calculation part 1620 obtains a revolution angle β based on an x-axis of such a calculated barycenter 1802. Here, in this case, a relationship between each position on the image 1800 in a direction of an x-axis and a revolution angle with respect to a reference direction is also preliminarily set based on a direction of placement of the two-dimensional image sensor part 103b.

<A Robustness of a Coordinate Detection System>

Then, a robustness of a coordinate detection system will be described for obtaining indication coordinates based on an x-axis of a barycenter of a pixel area. For example, a method for calculating indication coordinates based on an x-axis of a barycenter of a hemispherical pixel area is also effective for a case where light from the light emission part 1521 is reflected onto an input surface and a mirror image of the light emission part 1521 is taken in an image sampled from the taken image 601a or 601b.

Figure 19:
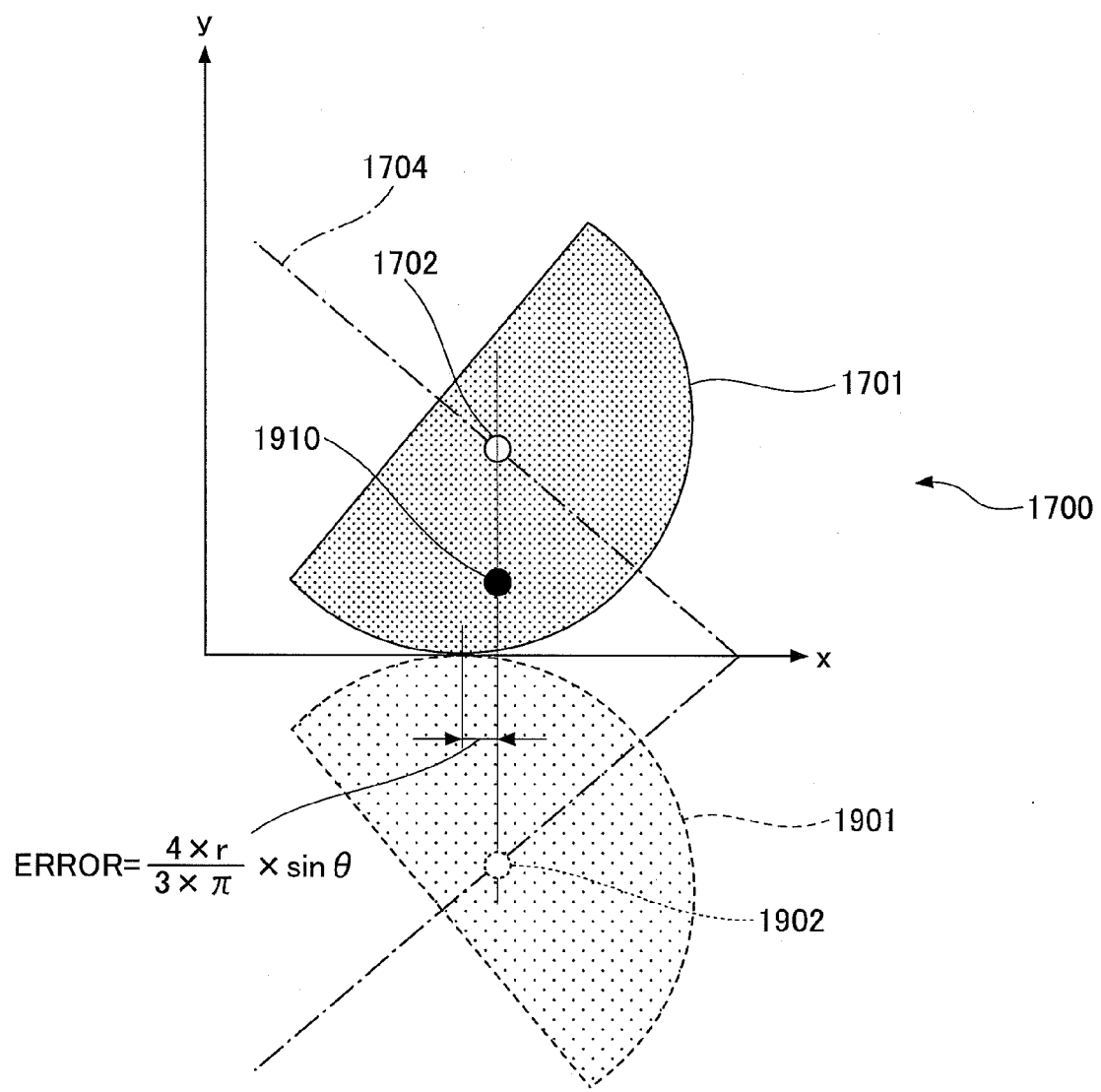
FIG. 19 is a diagram that illustrates a situation where a mirror image of a light emission part is reflected on an image.

FIG. 19 is a diagram that illustrates a situation such that a mirror image is taken in the image 1700. The barycenter 1702 of the hemispherical pixel area 1701 that represents the light emission part 1521 and a barycenter 1902 of a hemispherical pixel area 1901 that represents a mirror image of the light emission part 1521 have an identical x-coordinate. For this reason, a barycenter 1910 in a case where the hemispherical pixel area 1701 that represents the light emission part 1521 and the hemispherical pixel area 1901 that represents a mirror image of the light emission part 1521 are combined also has an identical x-coordinate.

Therefore, even when a mirror image is taken in the image 1700, it is possible to still keep an error with respect to an actual contact position at a distance d=(4×r×sin θ)/(3×π) in a case where indication coordinates are calculated based on an x-coordinate of the barycenter 1910.

<A Flow of an Indication Coordinate Calculation Process>

Figure 20:
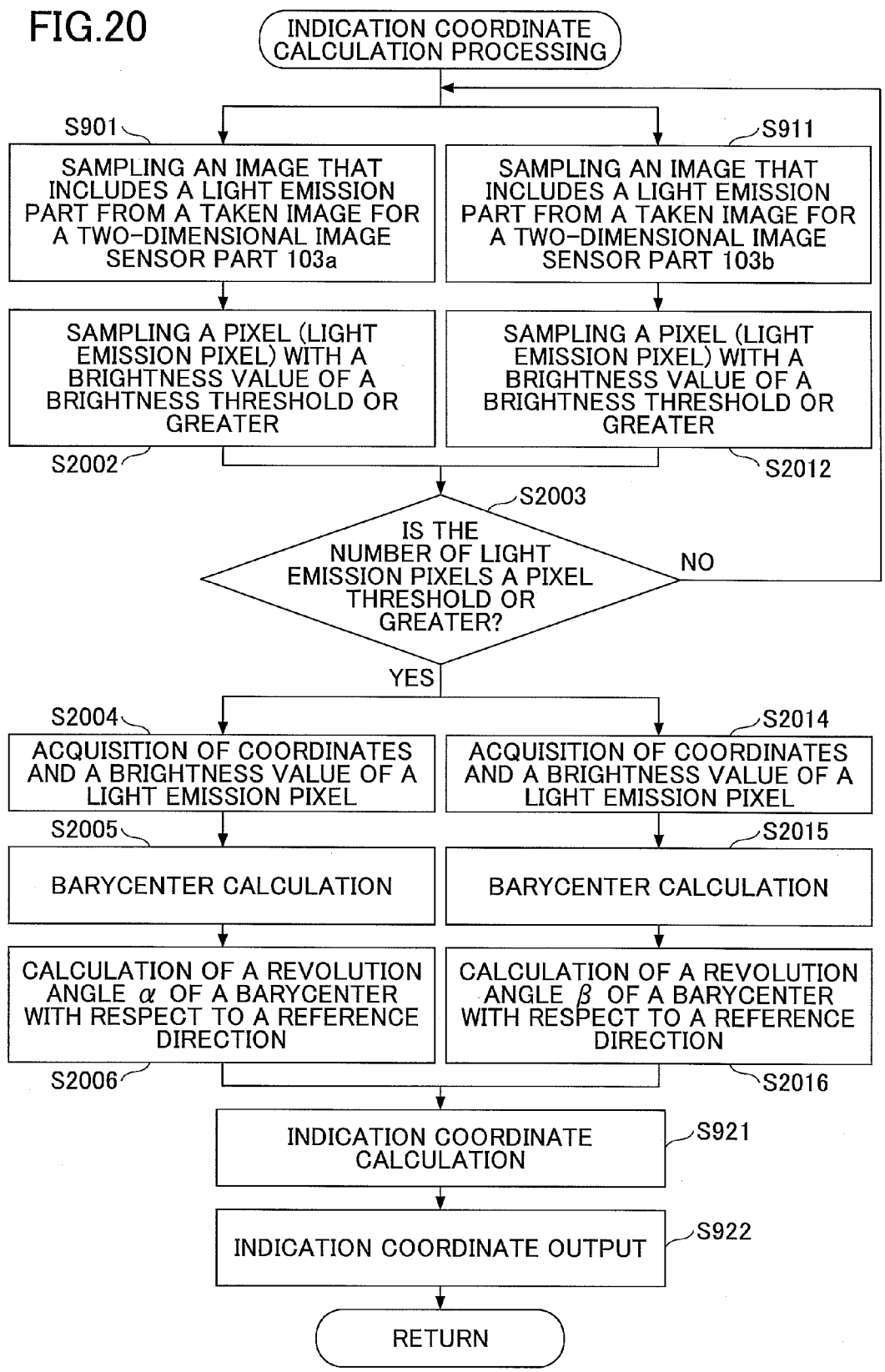
FIG. 20 is a flowchart that illustrates a flow of indication coordinate calculation processing.

Next, a flow of an indication coordinate calculation process in the coordinate detection system 100 will be described. FIG. 20 is a flowchart that illustrates a flow of an indication coordinate calculation process in the coordinate detection system 100. As imaging on the two-dimensional image sensor parts 103a and 103b is started, an indication coordinate calculation process is executed as illustrated in FIG. 20.

At step S901, the image acquisition part 301 samples the image 1700 that includes the light emission part 1521 from the taken image 601a that is taken by the two-dimensional image sensor part 103a. At step S2002, the barycenter detection part 1601 samples a pixel with a brightness value that is greater than or equal to a predetermined brightness threshold (that will be referred to as a light emission pixel) in such a sampled image 1700 that includes the light emission part 1521.

Similarly, at step S911, the image acquisition part 311 samples the image 1800 that includes the light emission part 1521 from the taken image 601b that is taken by the two-dimensional image sensor part 103b. At step S2012, the barycenter detection part 1611 samples a light emission pixel in such a sampled image 1800 that includes the light emission part 1521.

At step S2003, the barycenter detection part 1601 and the barycenter detection part 1611 determine whether or not a number for each light emission pixel is greater than or equal to a pixel threshold. If a determination at step S2003 is provided in such a manner that a number for one light emission pixel is not greater than or equal to a pixel threshold, returning to step S901 and step S911 is executed. On the contrary, if a determination at step S2003 is provided in such a manner that a number for any light emission pixel is greater than or equal to a pixel threshold, going to step S2004 and step S2014 is executed.

At step S2004, the barycenter detection part 1601 acquires coordinates of each light emission pixel sampled from the image 1700 and a brightness value of each light emission pixel. At step S2005, the barycenter detection part 1601 calculates a position of a barycenter by using coordinates (and a brightness value) acquired at step S2004 and acquires an x-coordinate of the barycenter.

At step S2006, the indication coordinate calculation part 1620 calculates a revolution angle α of a barycenter with respect to a reference direction based on an x-coordinate of the barycenter that is acquired at step S2005.

Similarly, at step S2014, the barycenter detection part 1611 acquires coordinates of each light emission pixel sampled from the image 1800 and a brightness value of each light emission pixel. At step S2015, the barycenter detection part 1611 calculates a position of a barycenter by using coordinates (and a brightness value) acquired at step S2014 and acquires an x-coordinate of the barycenter.

At step S2016, the indication coordinate calculation part 1620 calculates a revolution angle β of a barycenter with respect to a reference direction based on an x-coordinate of the barycenter that is acquired at step S2015.

Because processes at step S921 and step S922 herein are similar to processes at step S921 and step S922 in FIG. 9, a description thereof has been omitted.

<A Summary>

As is clear from the above descriptions, a coordinate detection system according to the present embodiment is:
such that a tip part of an indication tool is composed of a light emission part with a hemispherical shape;
configured in such a manner that an x-coordinate of a barycenter of a hemispherical pixel area that represents a light emission part is calculated from a taken image that is taken from each two-dimensional image sensor part and a revolution angle of the barycenter with respect to a reference direction is calculated based on such an x-coordinate; and
configured in such a manner that coordinates of a contact position of a tip part of an indication tool on an input surface of a coordinate input device are calculated based on such a calculated revolution angle.

Thereby, it is possible to reduce a displacement between a contact position and an indication position and mitigate a feeling of strangeness at a time of a handwriting input by a user, even when a tip part of an indication tool is composed of a light emission part with a hemispherical shape.

Here, in a case where a tip part of an indication tool has a hemispherical shape, there is an advantage in that durability against contact wearing is improved, because a force is dispersed in an area that contacts an input surface. Furthermore, there is also an advantage in that a safety at a time of holding by a user is improved.

A Seventh Embodiment

Although the first to sixth embodiments described above have not particularly referred to a method for an On/OFF control of the light emission circuit 411, the light emission circuit 411 may control ON/OFF based on, for example, contact or non-contact of a tip part of an indication tool and an input surface of a coordinate input device.

Specifically, in a case where a tip part of an indication tool contacts an input surface of a coordinate input device to press the tip part of the indication tool, a pressure sensor for sensing it may be disposed to control ON/OFF of the light emission circuit 411 based on an output from the pressure sensor.

Furthermore, although the first to sixth embodiments described above have not particularly referred to a configuration of a light emission part provided on a tip part of an indication tool, a light emission part may be configured, for example, to cover a periphery of a light emitting diode (LED) with a light diffusion member.

Figure 21:
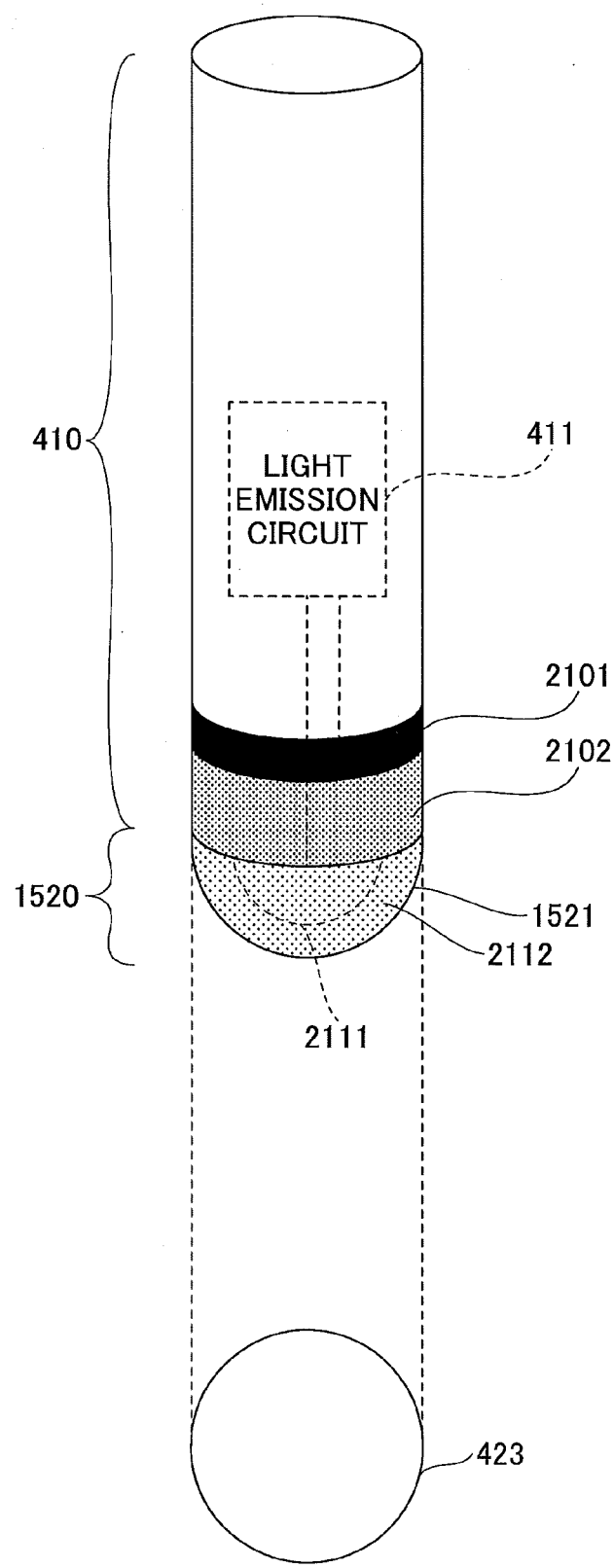
FIG. 21 is a diagram that illustrates another configuration of an indication tool.

FIG. 21 is a diagram that illustrates a configuration of an indication tool 2100 wherein an ON/OFF control function of the light emission circuit 411 and a configuration of a light emission part are illustrated clearly. Here, although FIG. 21 illustrates an indication tool with a tip part that has a hemispherical shape, a case where a tip part of an indication tool has a conical shape is similar thereto.

As illustrated in FIG. 21, the holding part 410 is provided with a pressure sensor 2101 that is composed of a polymeric pressure membrane film and a pressure transmission member 2102. Thereby, it is possible for the pressure sensor 2101 to sense a pressure via the pressure transmission member 2102 in a case where the tip part 1520 of the indication tool 2100 contacts and is pressed by an input surface of a coordinate input device. The light emission circuit 411 is provided in an ON state in a case where a pressure sensed by the pressure sensor 2101 is greater than or equal to a predetermined value, or provided in an OFF state in a case where it is less than the predetermined value. Thereby, it is possible for a user to control turning-on or turning off of an LED 2111 without executing an operation for controlling ON/OFF of the light emission circuit 411.

Furthermore, the light emission part 1521 of the tip part 1520 in an example of FIG. 21 is composed of the LED 2111 with a dome shape and a light diffusion member 2112 that covers a periphery of the LED 2111. As a result, it is possible to cause the whole of the light emission part 1521 to emit light uniformly and it is possible to calculate coordinates of a barycenter at a good precision.

An Eighth Embodiment

Each embodiment described above has described a case where the coordinate detection system 100 is such that the coordinate input device 101, the computer (information processing device) 102, the two-dimensional image sensor parts 103a-103d, and the peripheral light emission parts 104a-104d are configured as one device.

However, an embodiment of the present invention is limited thereto, and any one or more of the coordinate input device 101, the computer (information processing device) 102, the two-dimensional image sensor parts 103a-103d, and the peripheral light emission parts 104a-104d may be configured as a separate body.

Here, an embodiment of the present invention is not limited to a configuration illustrated herein, like a combination of a configuration provided in the embodiment described above or the like with another element. In regard to these matters, it is possible to apply modification thereto within a scope that does not depart from the spirit of an embodiment of the present invention and it is possible to provide an appropriate determination depending on an application mode thereof.

APPENDIX

<An Illustrative Embodiment(s) of a Coordinate Detection System, an Information Processing Device, a Coordinate Detection Method, and a Program>

At least one illustrative embodiment of the present invention may relate to at least one of a coordinate detection system, an information processing device, a coordinate detection method, and a program.

At least one illustrative embodiment of the present invention may be provided while a problem(s) as described above is/are taken into consideration, and may aim at improving an operability of an indication tool in a coordinate detection system.

A coordinate detection system according to at least one illustrative embodiment of the present invention may have a configuration as described below. That is, a coordinate detection system that detects coordinates that are indicated by an indication tool that executes an indication operation on a panel surface and has a tip part that includes a conical shape or a truncated-conical shape may have a first image taking device and a second image taking device that are disposed at predetermined positions on the panel surface, a detection means that detects two oblique lines of a conical shape or a truncated-conical shape of a tip part of the indication tool based on a first taken image that is taken by the first image taking device and detects two oblique lines of a conical shape or a truncated-conical shape of a tip part of the indication tool based on a second taken image that is taken by the second image taking device, and a calculation means that calculates coordinates of a vertex of the tip part on the panel surface based on a point of intersection between two oblique lines detected based on the first taken image and a point of intersection between two oblique lines detected based on the second taken image by the detection means.

According to at least one illustrative embodiment of the present invention, it may be possible to improve an operability of an indication tool in a coordinate detection system.

Illustrative Embodiment (1) is a coordinate detection system that detects coordinates that are indicated by an indication tool that executes an indication operation on a panel surface and has a tip part that includes a conical shape or a truncated-conical shape, wherein the coordinate detection system is characterized by having a first image taking device and a second image taking device that are disposed at predetermined positions on the panel surface, a detection means that detects two oblique lines of a conical shape or a truncated-conical shape of a tip part of the indication tool based on a first taken image that is taken by the first image taking device and detects two oblique lines of a conical shape or a truncated-conical shape of a tip part of the indication tool based on a second taken image that is taken by the second image taking device, and a calculation means that calculates coordinates of a vertex of the tip part on the panel surface based on a point of intersection between two oblique lines detected based on the first taken image and a point of intersection between two oblique lines detected based on the second taken image by the detection means.

Illustrative Embodiment (2) is the coordinate detection system as described in Illustrative Embodiment (1), characterized in that the detection means executes edge processing to detect contour pixels that indicate a boundary between the tip part and peripheral pixels from each of the first taken image and the second taken image and calculates an approximate straight line based on the detected contour pixels to detect the two oblique lines.

Illustrative Embodiment (3) is the coordinate detection system as described in Illustrative Embodiment (1) or (2), characterized in that the calculation means calculates a first revolution angle of a vertex of the tip part on the panel surface with respect to a reference direction based on a point of intersection between two oblique lines detected based on the first taken image, calculates a second revolution angle of a vertex of the tip part on the panel surface with respect to a reference direction based on a point of intersection between two oblique lines detected based on the second taken image, and calculates coordinates of a vertex of the tip part on the panel surface based on the calculated first and second revolution angles.

Illustrative Embodiment (4) is a coordinate detection method in a coordinate detection system that detects coordinates that are indicated by an indication tool that executes an indication operation on a panel surface and has a tip part that includes a conical shape or a truncated-conical shape, wherein the coordinate detection method is characterized by having a detection step that detects two oblique lines of a conical shape or a truncated-conical shape of a tip part of the indication tool based on a first taken image that is taken by a first image taking device disposed at a predetermined position on the panel surface and detects two oblique lines of a conical shape or a truncated-conical shape of a tip part of the indication tool based on a second taken image that is taken by a second image taking device disposed at a predetermined position on the panel surface, and a calculation step that calculates coordinates of a vertex of the tip part on the panel surface based on a point of intersection between two oblique lines detected based on the first taken image and a point of intersection between two oblique lines detected based on the second taken image in the detection step.

Illustrative Embodiment (5) is the coordinate detection method as described in Illustrative Embodiment (4), characterized in that the detection step executes edge processing to detect contour pixels that represent a boundary between the tip part and peripheral pixels from each of the first taken image and the second taken image and calculates an approximate straight line based on the detected contour pixels to detect the two oblique lines.

Illustrative Embodiment (6) is the coordinate detection method as described in Illustrative Embodiment (4) or (5), characterized in that the calculation step calculates a first revolution angle of a vertex of the tip part on the panel surface with respect to a reference direction based on a point of intersection between two oblique lines detected based on the first taken image, calculates a second revolution angle of a vertex of the tip part on the panel surface with respect to a reference direction based on a point of intersection between two oblique lines detected based on the second taken image, and calculates coordinates of a vertex of the tip part on the panel surface based on the calculated first and second revolution angles.

Illustrative Embodiment (7) is an information processing device that controls a coordinate input device that has a panel surface where an indication operation is executed by an indication tool that has a tip part that includes a conical shape or a truncated-conical shape, wherein the information processing device is characterized by having a detection means that detects two oblique lines of a conical shape or a truncated-conical shape of a tip part of the indication tool based on a first taken image that is taken by a first image taking device disposed at a predetermined position on the panel surface and detects two oblique lines of a conical shape or a truncated-conical shape of a tip part of the indication tool based on a second taken image that is taken by a second image taking device disposed at a predetermined position on the panel surface, and a calculation means that calculates coordinates of a vertex of the tip part on the panel surface based on a point of intersection between two oblique lines detected based on the first taken image and a point of intersection between two oblique lines detected based on the second taken image by the detection means.

Illustrative Embodiment (8) is the information processing device as described in Illustrative Embodiment (7), characterized in that the detection means executes edge processing to detect contour pixels that represent a boundary between the tip part and peripheral pixels from each of the first taken image and the second taken image and calculates an approximate straight line based on the detected contour pixels to detect the two oblique lines.

Illustrative Embodiment (9) is the information processing device as described in Illustrative Embodiment (7) or (8), characterized in that the calculation means calculates a first revolution angle of a vertex of the tip part on the panel surface with respect to a reference direction based on a point of intersection between two oblique lines detected based on the first taken image, calculates a second revolution angle of a vertex of the tip part on the panel surface with respect to a reference direction based on a point of intersection between two oblique lines detected based on the second taken image, and calculates coordinates of a vertex of the tip part on the panel surface based on the calculated first and second revolution angles.

Illustrative Embodiment (10) is a program for causing an information processing device that controls a coordinate input device that has a panel surface where an indication operation is executed by an indication tool that has a tip part that includes a conical shape or a truncated-conical shape to function as a detection means that detects two oblique lines of a conical shape or a truncated-conical shape of a tip part of the indication tool based on a first taken image that is taken by a first image taking device disposed at a predetermined position on the panel surface and detects two oblique lines of a conical shape or a truncated-conical shape of a tip part of the indication tool based on a second taken image that is taken by a second image taking device disposed at a predetermined position on the panel surface, and a calculation means that calculates coordinates of a vertex of the tip part on the panel surface based on a point of intersection between two oblique lines detected based on the first taken image and a point of intersection between two oblique lines detected based on the second taken image by the detection means.

Illustrative Embodiment (11) is a coordinate detection system that detects coordinates that are indicated by an indication tool that executes an indication operation on a panel surface and has a tip part with a hemispherical shape, wherein the coordinate detection system is characterized by having a first image taking device and a second image taking device that are disposed at predetermined positions on the panel surface, a detection means that detects a position of a barycenter of a pixel area that represents a hemispherical shape of a tip part of the indication tool based on a first taken image that is taken by the first image taking device and detects a position of a barycenter of a pixel area that represents a hemispherical shape of a tip part of the indication tool based on a second taken image that is taken by the second image taking device, and a calculation means that calculates coordinates indicated by the indication tool on the panel surface based on a position of a barycenter detected based on the first taken image and a position of a barycenter detected based on the second taken image by the detection means.

Illustrative Embodiment (12) is the coordinate detection system as described in Illustrative Embodiment (11), characterized in that the detection means samples pixels with a predetermined or greater brightness value in the first taken image and the second taken image as the pixel area.

Illustrative Embodiment (13) is the coordinate detection system as described in Illustrative Embodiment (12), characterized in that the detection means detects a position of the barycenter based on an average value of coordinates of respective pixels included in the pixel area or based on an average value of products values that are obtained by subtracting the predetermined brightness value from brightness values of respective pixels included in the pixel area and coordinates of respective pixels included in the pixel area.

According to the above-mentioned configuration of at least one illustrative embodiment of the present invention, it may be possible.

Although the illustrative embodiment(s) and specific example(s) of the present invention have been described with reference to the accompanying drawing(s), the present invention is not limited to any of the illustrative embodiment(s) and specific example(s), and the illustrative embodiment(s) and specific example(s) may be altered, modified, or combined without departing from the scope of the present invention.

The present application is based on and claims the benefit of priority to Japanese Patent Application No. 2014-001019 filed on Jan. 7, 2014, and Japanese Patent Application No. 2014-244651 filed on Dec. 3, 2014, the entire contents of which are herein incorporated by reference.

What is claimed is:

1. A coordinate detection system, comprising:
   a coordinate input device configured to include a panel surface;
   an indication tool configured to execute an indication operation on the panel surface, the indication tool including a tip part;
   a first image taking device configured to take a first image of the indication tool, the first image taking device being disposed on the panel surface;
   a second image taking device configured to take a second image of the indication tool, the second image taking device being disposed on the panel surface; and
   an information processing device configured to detect a first set of two oblique lines based on an outline of the tip part in the first image, detect a second set of two oblique lines based on an outline of the tip part in the second image, and calculate coordinates of a vertex of the tip part on the panel surface based on a first point of intersection between the two oblique lines included in the first set and a second point of intersection between the two oblique lines included in the second set.

2. The coordinate detection system as claimed in claim 1, wherein the information processing device is further configured to detect the first set of two oblique lines by detecting first pixels on the outline of the tip part in the first image and calculating an approximate straight line based on the first pixels and detect the second set of two oblique lines by detecting second pixels on the outline of the tip part in the second image and calculating an approximate straight line based on the second pixels.

3. The coordinate detection system as claimed in claim 1, wherein the information processing device is further configured to calculate a first revolution angle of a vertex of the tip part with respect to a reference direction on the panel surface based on the first point of intersection, calculate a second revolution angle of a vertex of the tip part with respect to a reference direction on the panel surface based on the second point of intersection, and calculate coordinates of a vertex of the tip part on the panel surface based on the first revolution angle and the second revolution angle.

4. A coordinate detection method, comprising:
   executing an indication operation on a panel surface included in a coordinate input device by an indication tool including a tip part;
   taking a first image of the indication tool by a first image taking device disposed on the panel surface;
   taking a second image of the indication tool by a second image taking device disposed on the panel surface;
   detecting a first set of two oblique lines of based on an outline of the tip part in the first image;
   detecting a second set of two oblique lines based on an outline of the tip part in the second image; and
   calculating coordinates of a vertex of the tip part on the panel surface based on a first point of intersection between the two oblique lines included in the first set and a second point of intersection between the two oblique lines included in the second set.

5. The coordinate detection method as claimed in claim 4, wherein the detecting the first set of two oblique lines includes detecting first pixels on the outline of the tip part in the first image and calculating an approximate straight line based on the first pixels and the detecting the second set of two oblique lines includes detecting second pixels on the outline of the tip part in the second image and calculating an approximate straight line based on the second pixels.

6. The coordinate detection method as claimed in claim 4, wherein the calculating coordinates of a vertex of the tip part on the panel surface includes calculating a first revolution angle of a vertex of the tip part with respect to a reference direction on the panel surface based on the first point of intersection and calculating a second revolution angle of a vertex of the tip part with respect to a reference direction on the panel surface based on the second point of intersection.

7. An information processing device, comprising:
   a computer, the computer being configured to execute a process including:
   taking a first image of an indication tool including a tip part by a first image taking device disposed on a panel surface included in a coordinate input device;
   taking a second image of the indication tool by a second image taking device disposed on the panel surface;
   detecting a first set of two oblique lines based on an outline of the tip part in the first image;
   detecting a second set of two oblique lines based on an outline of the tip part in the second image; and
   calculating coordinates of a vertex of the tip part on the panel surface based on a first point of intersection between two oblique lines included in the first set and a second point of intersection between two oblique lines included in the second set.

8. The information processing device as claimed in claim 7, wherein the detecting the first set of two oblique lines includes detecting first pixels on the outline of the tip part in the first image and calculating an approximate straight line based on the first pixels and the detecting the second set of two oblique lines includes detecting second pixels on the outline of the tip part in the second image and calculating an approximate straight line based on the second pixels.

9. The information processing device as claimed in claim 7, wherein the calculating coordinates of a vertex of the tip part on the panel surface includes calculating a first revolution angle of a vertex of the tip part with respect to a reference direction on the panel surface based on the first point of intersection and calculating a second revolution angle of a vertex of the tip part with respect to a reference direction on the panel surface based on the second point of intersection.

* * * * *